(12) United States Patent
Ajiro

(10) Patent No.: US 9,760,152 B2
(45) Date of Patent: Sep. 12, 2017

(54) INFORMATION PROCESSING DEVICE

(71) Applicant: NEC Corporation, Tokyo (JP)

(72) Inventor: Shinya Ajiro, Tokyo (JP)

(73) Assignee: NEC Corporation, Tokyo (JP)

( * ) Notice: Subject to any disclaimer, the term of this patent is extended or adjusted under 35 U.S.C. 154(b) by 9 days.

(21) Appl. No.: 14/662,129

(22) Filed: Mar. 18, 2015

(65) Prior Publication Data

US 2015/0277537 A1 Oct. 1, 2015

(30) Foreign Application Priority Data

Mar. 25, 2014 (JP) .................................. 2014-061483

(51) Int. Cl.
*G06F 1/32* (2006.01)
*G06F 1/28* (2006.01)
*H02J 1/00* (2006.01)

(52) U.S. Cl.
CPC .......... *G06F 1/3234* (2013.01); *G06F 1/3212* (2013.01); *Y02B 60/1292* (2013.01)

(58) Field of Classification Search
CPC .. G06F 1/3234; G06F 1/3212; Y02B 60/1292
See application file for complete search history.

(56) References Cited

U.S. PATENT DOCUMENTS

| | | | | |
|---|---|---|---|---|
| 7,206,944 B2* | 4/2007 | Odaohhara | ............. | G06F 1/263 713/300 |
| 7,853,816 B2* | 12/2010 | Tanaka | .................. | G06F 1/3209 713/322 |
| 7,933,689 B2* | 4/2011 | Warren | ..................... | H02J 9/06 307/23 |
| 9,270,118 B2* | 2/2016 | Carlson | ............ | H01L 31/02021 |
| 2004/0103329 A1* | 5/2004 | Morisawa | ............... | G06F 1/263 713/300 |
| 2010/0299548 A1* | 11/2010 | Chadirchi | ............... | G06F 1/263 713/340 |

FOREIGN PATENT DOCUMENTS

| | | |
|---|---|---|
| JP | 2003-150281 A | 5/2003 |
| JP | 2009-267880 A | 11/2009 |
| JP | 2011-223786 A | 11/2011 |
| JP | 2012-003438 A | 1/2012 |

(Continued)

OTHER PUBLICATIONS

Japanese Office Action in JPA No. 2014-061483.

(Continued)

*Primary Examiner* — M Elamin
(74) *Attorney, Agent, or Firm* — McGinn IP Law Group, PLLC

(57) ABSTRACT

The information processing device includes a receiving unit that receives a notice, a power receiving unit that receives power supplied from a power storage unit and another power supply unit, and a power consumption control unit that controls power consumption such that the power consumption does not exceed a power value set by the notice. The power consumption control unit controls the power consumption such that the power consumption does not exceed a power value available from the other power supply unit, if a predetermined condition is satisfied.

20 Claims, 13 Drawing Sheets

(56) References Cited

FOREIGN PATENT DOCUMENTS

| JP | 2012-95424 A | 5/2012 |
| JP | 2012-203583 A | 10/2012 |
| JP | 2013-541309 A | 11/2013 |

OTHER PUBLICATIONS

Concise Explanation of Relevance (English-language) of JP Office Action.
Japanese Office Action dated Oct. 6, 2015 with an English translation thereof.
Japanese Office Action in Application No. 2015-235330 dated Nov. 1, 2016 with a partial English translation thereof.

\* cited by examiner

INFORMATION PROCESSING DEVICE

INCORPORATION BY REFERENCE

The present invention is based upon and claims the benefit of priority from Japanese patent application No. 2014-061483, filed on Mar. 25, 2014, the disclosure of which is incorporated herein in its entirety by reference.

TECHNICAL FIELD

The present invention relates to an information processing device, and in particular, to an information processing device which operates with electric power supplied from a power supply unit and a battery.

BACKGROUND ART

Recently, information processing devices are used in various systems. However, in an information processing device, power consumption varies according to changes in the demand for processing load and a processing state such that an application has a peak time. As such, in order to realize stable operation, power control in an information processing device is important. Particularly, in an information processing device such as a server device in which full-time operation is required, it is necessary to prevent server down due to power supply shortage.

As a technology to control power of an information processing device corresponding to the above-described situation, a technology called a power peak assist function, as shown in Patent Document 1, has been known. In order to realize such a power peak assist function, first, a power supply unit and a battery are provided as a power supply module. Then, in addition to power supply from the power supply unit to the information processing device, the power used by the information processing device is assisted by power supply from the battery, by the power peak assist function.

Here, an example of the power peak assist function will be further described specifically. First, in order to realize the power peak assist function, in addition to the power supply module described above, a peak assist control unit, which controls the amount of power supplied from the power supply unit and the battery to the information processing device, is provided. The peak assist control unit detects the residual amount of the battery from the power supply module, and based on the information, instructs the information processing device of permissible power consumption. Thereby, the information processing device is able to perform operation within the range of the instructed power consumption, and the power is supplied from the power supply unit and the battery up to the power consumption value. Further, in the case where the residual amount of the battery is in short, the peak assist control unit controls the information processing device to operate within the power value available only from the power supply unit.

Patent Document 1: JP 2003-150281 A

However, if the power peak assist function is used as described above, there is a case where the peak assist control unit is unable to control power consumption of an information processing device due to contingencies such as malfunction of the peak assist control unit or network overload. In that case, the information processing device may operate by using power of a larger value than the power available only from the power supply unit, which may cause a problem that the information processing device goes down due to power shortage. Further, such a problem may also be caused in the case where the information processing device continues operation by using power of a larger value than the power available only from the power supply unit due to any conditions, not by an instruction from the power peak assist function.

SUMMARY

As such, an exemplary object of the present invention is to provide an information processing device capable of solving the above-described problem, that is, a problem that an information processing device goes down due to power shortage.

An information processing device, which is an exemplary aspect of the present invention, is configured to include
  a receiving unit that receives a notice;
  a power receiving unit that receives power supplied from a power storage unit and another power supply unit; and
  a power consumption control unit that controls power consumption such that the power consumption does not exceed a power value set by the notice, wherein
  if a predetermined condition is satisfied, the power consumption control unit controls the power consumption such that the power consumption does not exceed a power value available from the other power supply unit.

An information processing system, which is another exemplary aspect of the present invention, is configured to include
  a power supply module including a power storage unit and another power supply unit;
  an information processing device that receives power supplied from the power supply module; and
  a function unit that notifies the information processing device of a power control notice, wherein
  the information processing device includes
    a receiving unit that receives the power control notice; and
    a power consumption control unit that controls power consumption such that the power consumption does not exceed a power value set by the power control notice, and
  if a predetermined condition is satisfied, the power consumption control unit controls the power consumption such that the power consumption does not exceed a power value available from the other power supply unit.

Further, a management device, which is another exemplary aspect of the present invention, is configured to include
  a function unit that notifies an information processing device of a power control notice, the information processing device being configured to receive power supplied from a power storage unit and another power supply unit, wherein
  the power control notice is a notice for controlling power consumption of the information processing device such that the power consumption does not exceed a power value set by the power control notice, upon receipt by the information processing device, and
  the function unit is configured to transmit information indicating that the function unit is operating, to the information processing device which controls the power consumption such that the power consumption does not exceed a power value available from the other power supply unit, if the operation of the function unit is not confirmed.

Further, a program stored on a non-transitory computer-readable medium, which is another exemplary aspect of the present invention, is configured to cause an information processing device to realize a receiving unit that receives a notice; and a power consumption control unit that receives power supplied from a power storage unit and another power supply unit, and controls power consumption such that the power consumption does not exceed a power value set by the notice, wherein if a predetermined condition is satisfied, the power consumption control unit controls the power consumption such that the power consumption does not exceed a power value available from the other power supply unit.

Further, a program stored on a non-transitory computer-readable medium, which is another exemplary aspect of the present invention, is configured to cause a management device to realize:

a function unit that notifies an information processing device of a power control notice, the information processing device receiving power supplied from a power storage unit and another power supply unit, wherein the power control notice is a notice for controlling power consumption of the information processing device such that the power consumption does not exceed a power value set by the power control notice, upon receipt by the information processing device, and the function unit is configured to transmit information indicating that the function unit is operating, to the information processing device which controls the power consumption such that the power consumption does not exceed a power value available from the other power supply unit, if the operation of the function unit is not confirmed.

Further, a power consumption control method, which is another exemplary aspect of the present invention, is configured to include receiving a notice;

receiving power supplied from a power storage unit and another power supply unit;

controlling power consumption such that the power consumption does not exceed a power value set by the notice, and if a predetermined condition is satisfied, controlling the power consumption such that the power consumption does not exceed a power value available from the other power supply unit.

Further, a power consumption control method, which is another aspect of the present invention, is configured to include notifying an information processing device of a power control notice, the information processing device receiving power supplied from a power storage unit and another power supply unit, the power control notice being a notice for controlling power consumption of the information processing device such that the power consumption does not exceed a power value set by the power control notice, upon receipt by the information processing device; and transmitting information indicating that a management device is operating, to the information processing device which controls the power consumption such that the power consumption does not exceed a power value available from the other power supply unit, if the operation of the management device is not confirmed.

With the configuration described above, the present invention is able to prevent an information processing device from going down due to power shortage.

EXEMPLARY EMBODIMENTS

First Exemplary Embodiment

Figure 1:
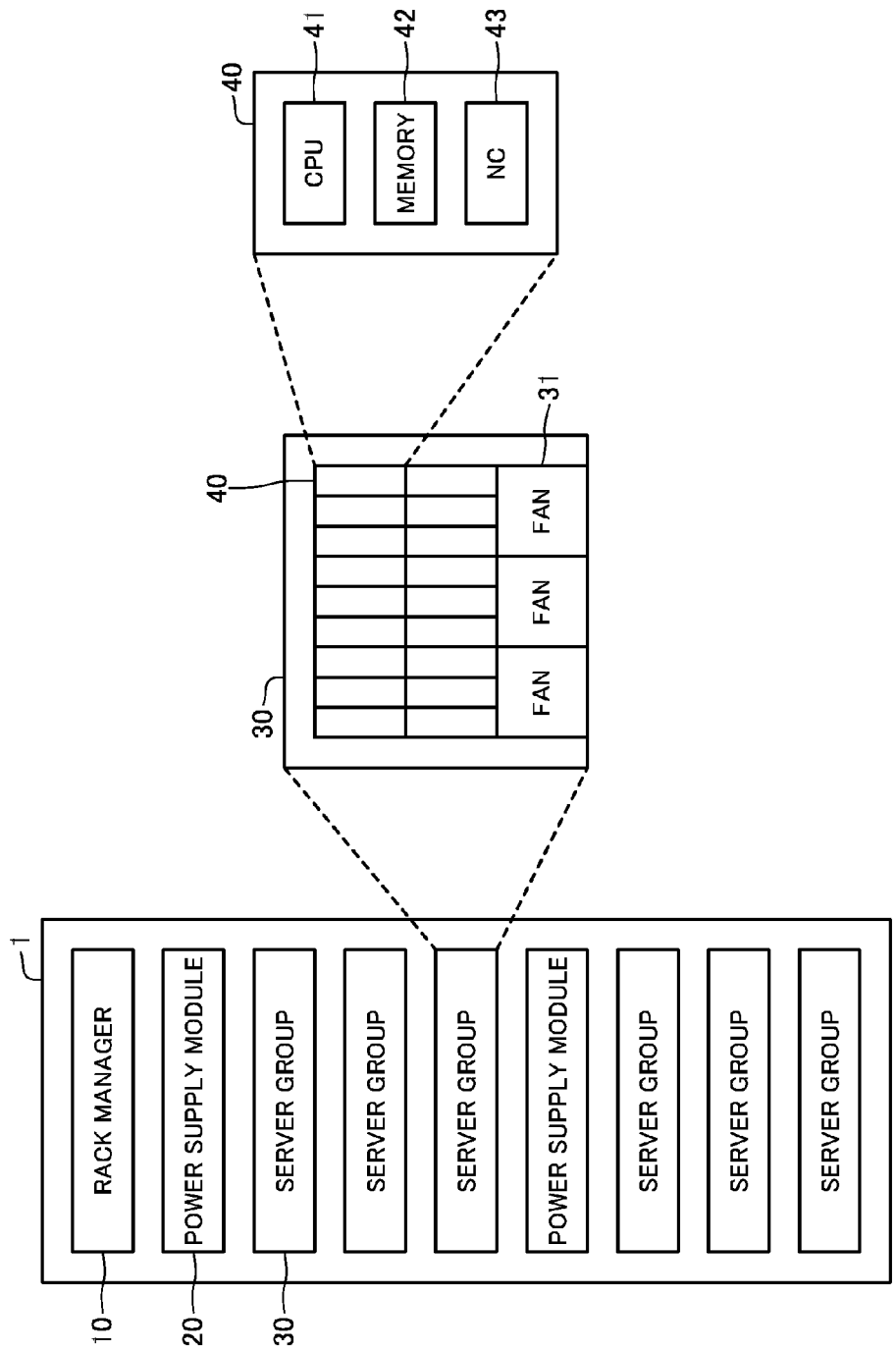
FIG. 1 is a block diagram showing a configuration of an information processing system according to a first exemplary embodiment of the present invention.
Figure 2:
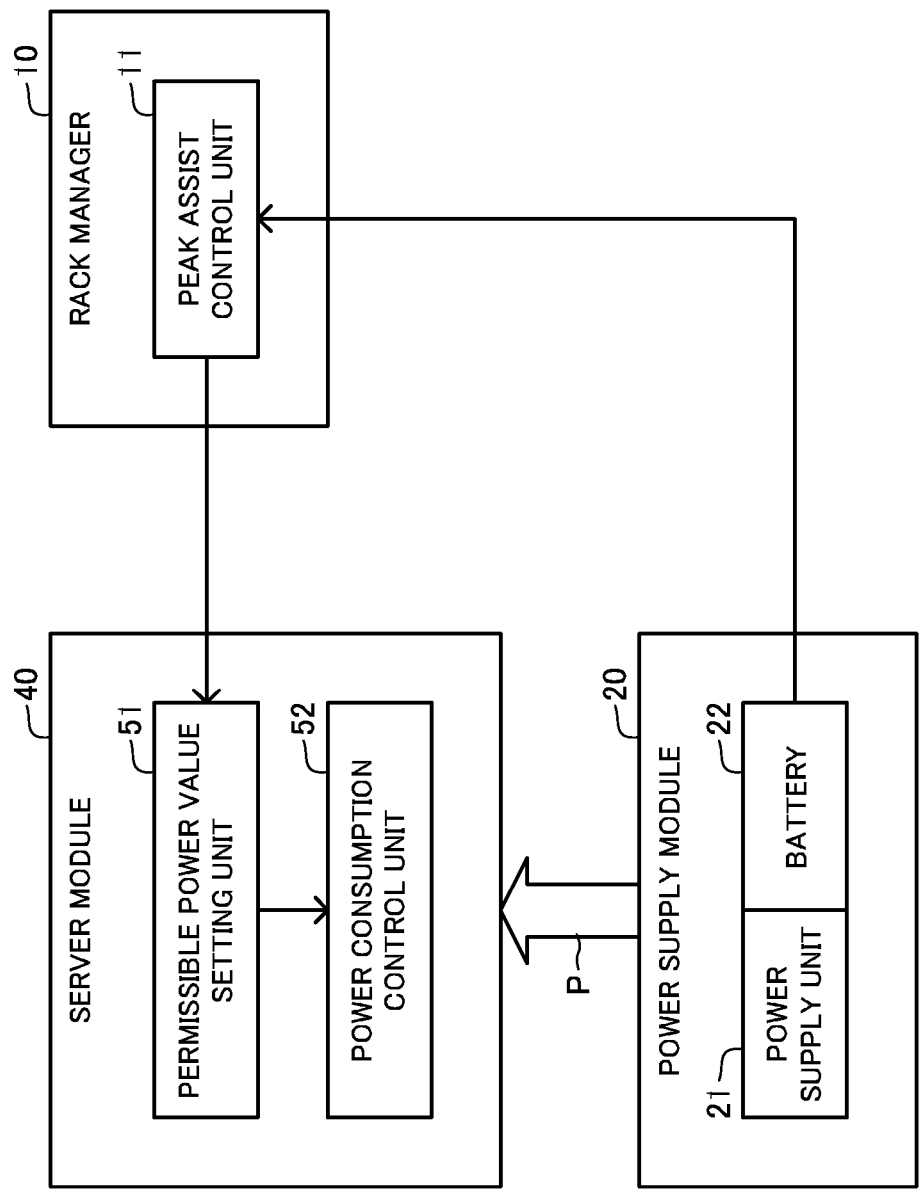
FIG. 2 is a function block diagram showing a configuration of the information processing system disclosed in FIG. 1.

A first exemplary embodiment of the present invention will be described with reference to FIGS. 1 to 7. FIGS. 1 and 2 are diagrams for explaining a configuration of an information processing system, and FIGS. 3 to 7 are illustrations for explaining the operation thereof.

[Configuration]

An information processing system 1 of the present embodiment is configured in the form of a rack server. This means that the information processing system 1 is formed such that respective devices constituting the information processing system 1 are installed on the respective shelves of a server rack having a plurality of shelves.

Specifically, as shown in FIG. 1, the information processing system 1 of the present embodiment includes a rack manager 10, power supply modules 20, and server groups 30, which are installed in the respective units formed of the respective shelves of the server rack. In the example of FIG. 1, the rack manager 10 is installed in one unit, the power supply modules 20 are installed in two units, and the server groups 30 are installed in six units, respectively. However, the numbers of the rack manager 10, the power supply modules 20, and the server groups 30, constituting the information processing system 1 of the present invention are not necessarily limited to the numbers described above. Further, the configuration of the information processing system 1 is not limited to the form of a rack server.

As shown in FIG. 1, each of the server groups 30 includes a plurality of server modules 40. Each of the server modules 40 includes a CPU (Central Processing Unit) 41 which is an arithmetic unit, a memory 42 which is a storage unit, and a network card (shown as "NC") 43 which is a communication device, and the server module 40 operates as an information processing device individually. It should be noted that the configuration of the server module 40 is not limited to that described above. The server module 40 may be an information processing device having any configuration including one working as a storage server having a hard disk, for example.

The server group 30 also includes fans 31 for cooling the server modules 40. However, the configuration of the server group 30 is not limited to that described above.

The server module 40 operates with electric power supplied from the power supply module 20. Here, the power supply module 20 of the present embodiment is configured such that one power supply module supplies power to a plurality of server modules 40. However, it is not limited that the power supply module 20 supplies power to a plurality of server modules 40. It is also receivable that one power supply module 20 is provided corresponding to one server module 40.

Further, the rack manager 10 is configured of an information processing device having an arithmetic unit, and has a peak assist function for performing power setting of each of the server modules 40, which will be described below. It should be noted that the rack manager 10 may be configured of one information processing device, or a plurality of information processing devices. Further, the rack manager 10 may be configured such that one information processing device provides the peak assist function for a plurality of server modules 40 or one information processing device provides the peak assist function for one server module 40.

Next, details of the configurations of the rack manager 10, the power supply module 20, and the server module 40 will be described with reference to FIGS. 2 to 5.

First, the configuration of the power supply module 20 will be described. As shown in FIG. 2, the power supply module 20 includes a power supply unit (PSU) 21 (another power supply unit) which converts power from an AC source into a direct current and supplies it to the server module 40, and a battery 22 (power storage unit) which stores power and supplies the power to the server module 40. The power supply module 20 supplies power required by the server module 40, under the cooperation between the power supply unit 21 and the battery 22 (see reference sign P in FIG. 2). It should be noted that battery 22 may be any device such as a capacitor, provided that it is able to store power and is able to supply the stored power to the server module 40.

Accordingly, when the server module 40 requires power larger than that available from the power supply unit 21, power is supplied not only from the power supply unit 21 but also from the battery 22. In that case, the residual amount of the power stored in the battery 22 is decreased. Meanwhile, when the server module 40 requires power less than that available from the power supply unit 21, power is supplied only from the power supply unit 21. In that case, the extra power available from the power supply unit 21 is stored in the battery 22.

Next, the configuration of the rack manager 10 will be described. As shown in FIG. 2, the rack manager 10 includes a peak assist control unit 11 (function unit) which is configured by incorporating a program in the equipped arithmetic unit. The peak assist control unit 11 detects the residual amount of the power stored in the battery at predetermined time intervals Tb, and according to the residual amount, inputs a power value setting command (notice, power control notice) to the server module 40.

As an example, the peak assist control unit 11 determines whether or not the detected power residual amount of the battery 22 is not less than a predetermined threshold. The threshold is set to a value which is not less than a power value available from the power supply unit 21 and represents a power amount with which the server module 40 is able to operate for a predetermined period of time with power assistance from the battery 22. It should be noted that the threshold may be set to a different value according to the type of the server module 40 or for each of the server modules 40.

If the peak assist control unit 11 determines that the power residual amount of the battery 22 is not less than the threshold, the peak assist control unit 11 inputs, to the server module 40, a "first command" (first notice) of predetermined power value setting commands. The "first command" is a command to set a permissible power value to a high value (peak assist power value (first power value)) as described below. On the other hand, if the peak assist control unit 11 determines that the power residual amount of the battery 22 is less than the threshold, the peak assist control unit 11 inputs, to the server module 40, a "second command" (second notice) of the predetermined power value setting commands. The "second command" is a command to set the permissible power value to a low value (base power value (second power value)) as described below.

Each time the peak assist control unit 11 detects the power residual amount of the battery 22 at the predetermined time intervals Tb, the peak assist control unit 11 performs determination with respect to the threshold described above, and transmits a power value setting command to the server module 40. As such, if a state where the power residual amount of the battery 22 is not less than the threshold continues, the peak assist control unit 11 keeps inputting the "first command" at the predetermined time intervals Tb. However, the peak assist control unit 11 does not necessarily keep inputting the "second command" to the server module 40. For example, the peak assist control unit 11 may store the past commands having been input to the server module 40, and if the power residual amount of the battery 22 is less than the threshold, the peak assist control unit 11 may input the second command only when the previously input command is the first command.

Next, the configuration of the server module 40 will be described. As shown in FIG. 2, the server module 40 includes a permissible power value setting unit 51 and a power consumption control unit 52, which are constructed by incorporating a program into the equipped CPU 41.

The permissible power value setting unit 51 (receiving unit) receives a power value setting command input from the peak assist control unit 11, and sets a permissible power value representing a maximum value of the power which can be consumed by the server module 40 (information processing device), according to the power value setting command. As permissible power values, two values have been prepared in advance, namely a "base power value" (second power value) and a "peak assist power value" (first power value). In the present embodiment, the "base power value" is a power value available only from the power supply unit 21, and the "peak assist power value" is larger power than the "base power value" and is a power value larger than the power value available only from the power supply unit 21. This means that the "peak assist power value" is a value which is achieved by adding the power supplied from the battery 22 to the power supplied from the power supply unit 21.

Figure 3:
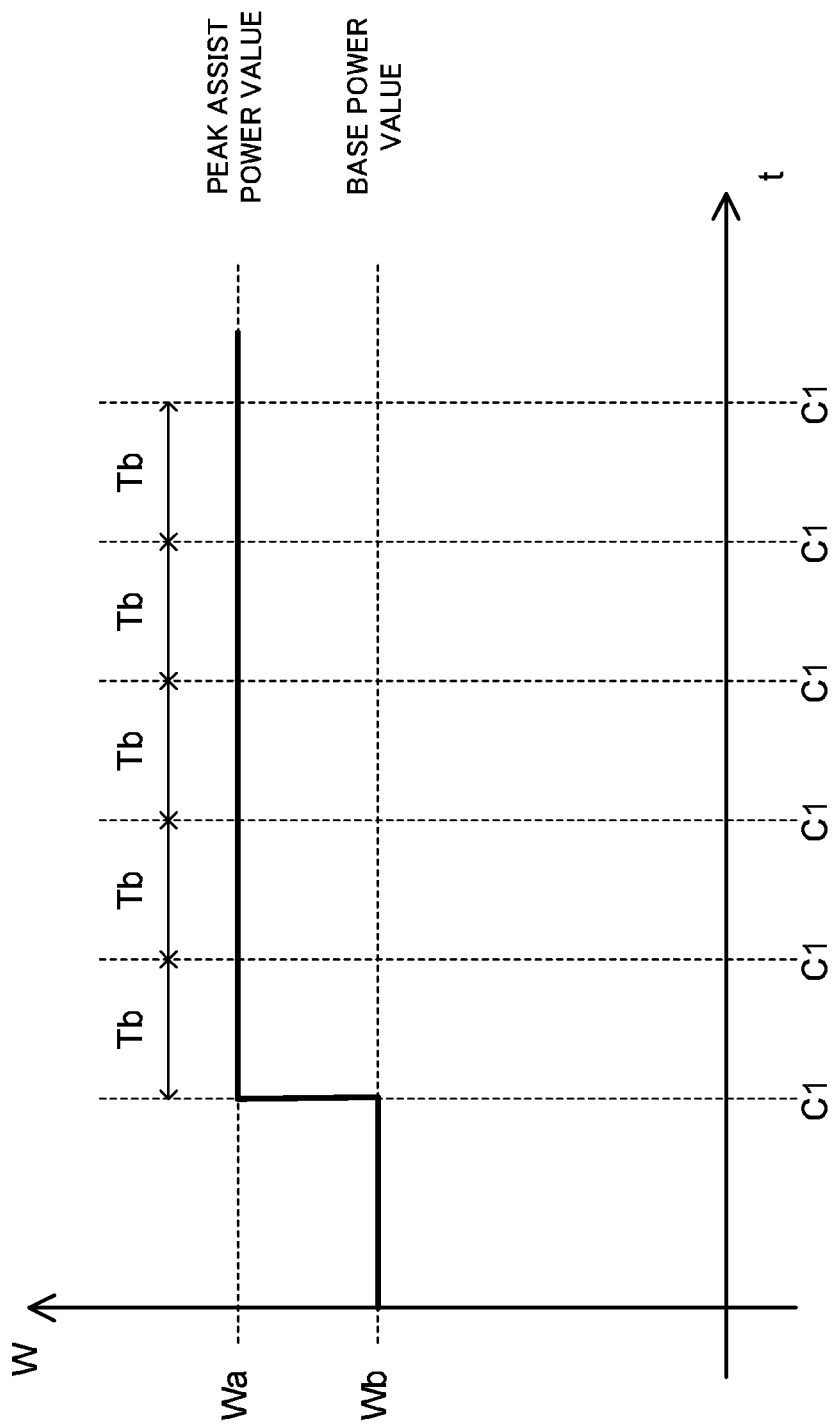
FIG. 3 is an illustration showing a state of setting a permissible power value in the server module disclosed in FIG. 2.
Figure 4:
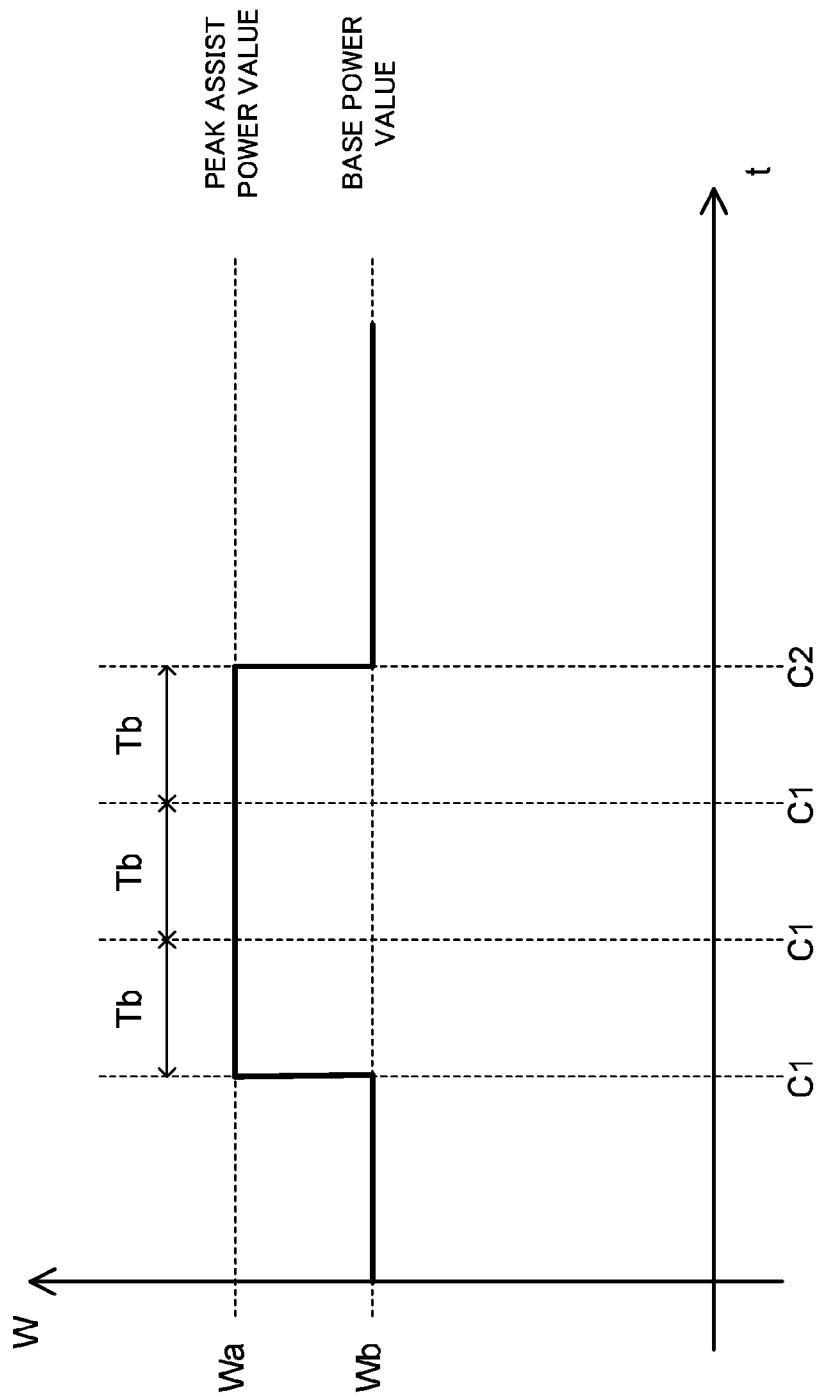
FIG. 4 is an illustration showing a state of setting a permissible power value in the server module disclosed in FIG. 2.
Figure 5:
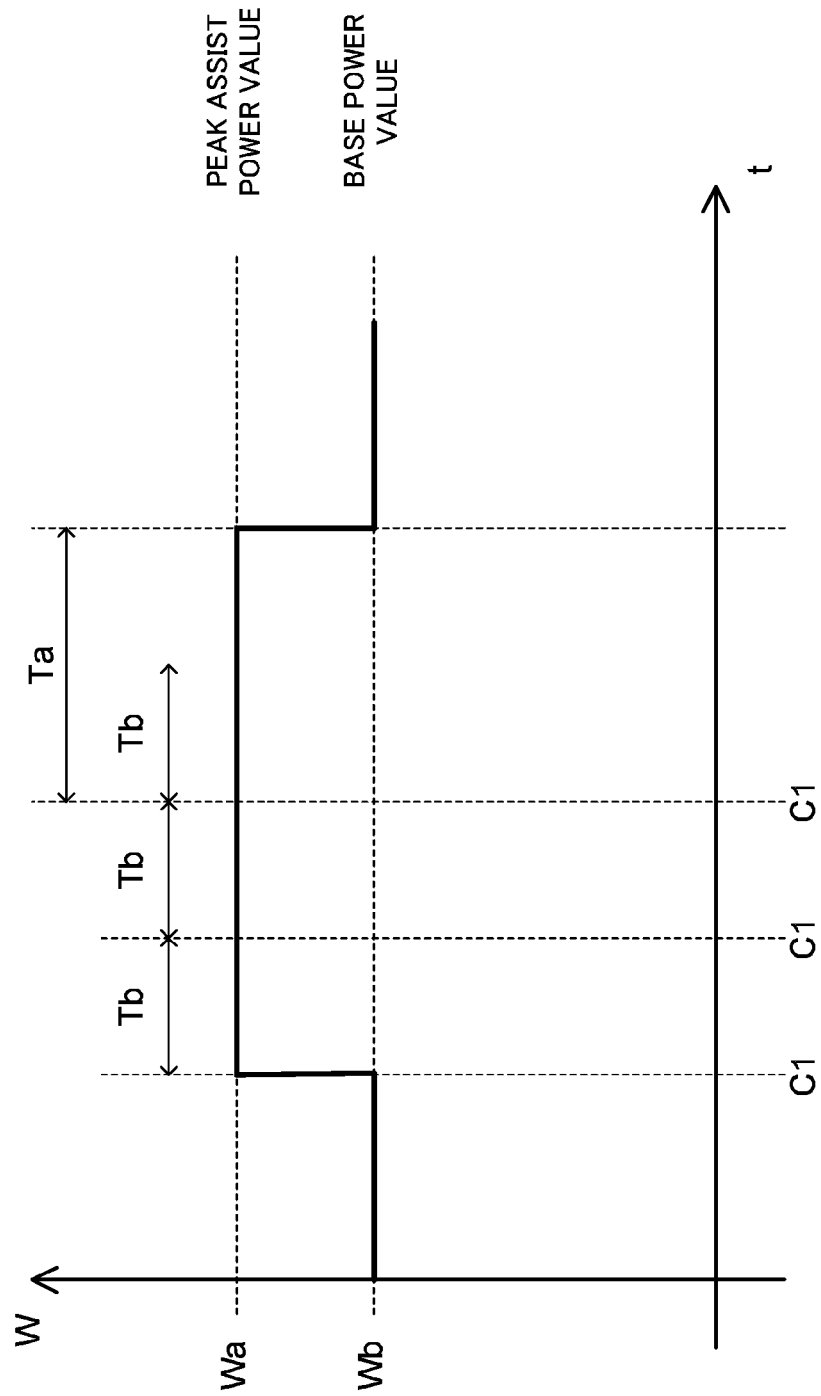
FIG. 5 is an illustration showing a state of setting a permissible power value in the server module disclosed in FIG. 2.

Specifically, when the permissible power value setting unit 51 receives, from the peak assist control unit 11, the "first command" which is a power value setting command to be input if the power residual amount of the battery 22 is not less than the threshold, the permissible power value setting unit 51 sets the permissible power value to the "peak assist power value". At this time, as shown in FIG. 3, when the permissible power value setting unit 51 receives an input of a "first command" C1 if the permissible power value is a "base power value" Wb, the permissible power value setting unit 51 sets the permissible power value to a "peak assist power value" Wa which is a larger value than the "base power value" Wb. Then, when the permissible power value setting unit 51 receives an input of the "first command" C1 if the permissible power value is the "peak assist power value" Wa, the permissible power value setting unit 51 resets the permissible power value to the "peak assist power value" Wa as it is. This means that when the "first command" is input at the predetermined time intervals Tb from the peak assist control unit 11 as described above, the permissible power value setting unit 51 resets the permissible power value to the "peak assist power value" Wa each time, as shown in FIG. 3. It should be noted that FIGS. 3 to 5 show changes in the permissible power value to be set, in which the vertical axis shows the permissible power value, and the horizontal axis shows the time.

Further, when the permissible power value setting unit 51 receives the "second command" which is a power value setting command to be input from the peak assist control unit 11 when the power residual amount of the battery 22 is lower than the threshold as described above, the permissible power value setting unit 51 sets the permissible power value to the "base power value". At this time, as shown in FIG. 4, when the permissible power value setting unit 51 receives a "second command" C2 when the permissible power value is the "peak assist power value" Wa, the permissible power value setting unit 51 sets the permissible power value to the "base power value" Wb which is a smaller vale than the "peak assist power value" Wa.

Then, when the permissible power value setting unit 51 of the present embodiment further receives the "first command" from the peak assist control unit 11 as described above, the permissible power value setting unit 51 starts time measurement by a timer. Then, the permissible power value setting unit 51 checks whether or not a "power value change time" which is a preset given time has elapsed after the reception of the "first command". If the permissible power value setting unit 51 receives an input of a new "first command" from the peak assist control unit 11 before the power value change time elapses from the start of the time measurement, the permissible power value setting unit 51 stops time measurement which is performed currently, and starts new time measurement. Then, when the time being measured passed the power value change time, the permissible power value setting unit 51 automatically sets the permissible power value to the "base power value". As such, as shown in FIG. 5, when the power value change time Ta has elapsed after the reception of the immediate "first command", the permissible power value setting unit 51 automatically sets the "peak assist power value", having been set (reset) by receiving the input of the immediate "first command", to the "base power value" which is a value lower than it.

Here, the "power value change time" Ta is set to a longer time than a time interval Tb at which the "first command" is input from the peak assist control unit 11, in other words, the time interval Tb at which the battery residual amount is detected by the peak assist control unit 11 and is compared with the threshold. As such, if the peak assist control unit 11 operates normally and a power value setting command reaches the server module 40 normally, when the time interval Tb has passed, the first command or the second command is input from the peak assist control unit 11 to the server module. However, as shown in FIG. 5, there is a case where no command is input from the peak assist control unit 11 to the server module even when the time interval Tb has passed, due to malfunction of the peak assist control unit 11 or a failure such as a communication failure from the peak assist control unit 11 to the server module 40. In that case, as the power value change time Ta will soon elapse after the immediate "first command" C1 is input, the setting of the permissible power value is automatically changed from the "peak assist power value" Wa to the "base power value" Wb.

Then, the power consumption control unit 52 (power receiving unit, power consumption control unit) receives power supply from the power supply module 20, and controls the server module 40, which is the own device, to operate with power not more than the permissible power value having been set. For example, the power consumption control unit 52 controls the load state of the CPU 41 provided in the server module 40 so as to cause the power consumption not to exceed the permissible power value. As such, if the permissible power value is set to the "base power value", the server module 40 is able to operate only with the power supplied from the power supply unit 21. On the other hand, if the permissible power value is set to the "peak assist power value", the server module 40 operates with an assistance of power supply from the battery 22, in addition to the power supplied from the power supply unit 21.

[Operation]

Next, operation of the information processing system 1, more specifically, operation of setting a permissible power value by the server module 40, will be described with reference to the graphs of the permissible power value of FIGS. 3 to 5 and the flowcharts of FIGS. 6 and 7.

Figure 6:
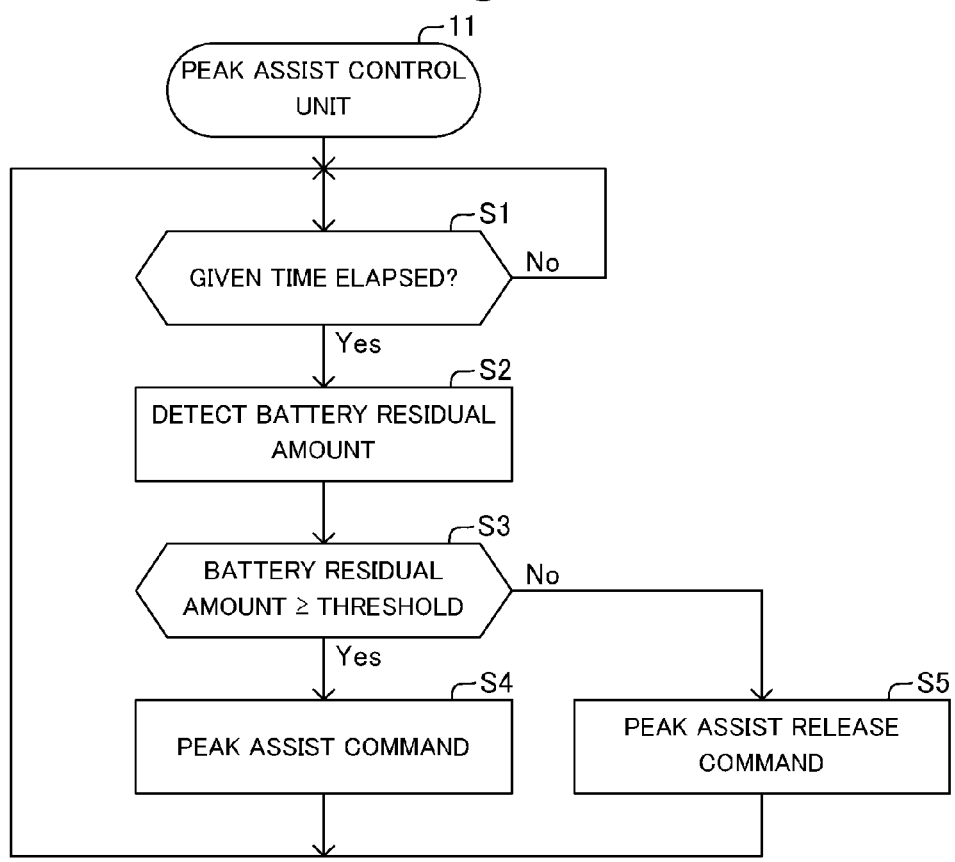
FIG. 6 is a flowchart showing operation of the peak assist control unit disclosed in FIG. 2.

First, each time a given time elapses, that is, at time intervals denoted by the reference sign Tb (step S1 of FIG. 6: Yes), the peak assist control unit 11 detects the power residual amount of the battery 22 (step S2 of FIG. 6). Then, the peak assist control unit 11 compares the detected power residual amount of the battery 22 with a threshold (step S3 of FIG. 6.). If the power residual amount of the battery 22 is not less than the threshold (step S3 of FIG. 6: Yes), the peak assist control unit 11 inputs, to the server module 40, a first command which is a command to set the permissible power value to a peak assist power value, of power value setting commands (step S4 of FIG. 6). On the other hand, if the power residual amount of the battery 22 is less than the threshold (step S3 of FIG. 6: No), the peak assist control unit 11 inputs, to the server module 40, a second command which is a command to set the permissible power value to a base power value, of the power value setting commands (step S5 of FIG. 6).

Then, the peak assist control unit 11 repeats the above-described processing at the given time intervals Tb. As such, the peak assist control unit 11 is configured to regularly input the first command C1 or the second command C2 to the server module 40 at the given time intervals Tb. However, it is not necessary to input the second command continuously.

The permissible power value setting unit 51 of the server module 40, which receives an input of the power value setting command (first command, second command) from the peak assist control unit 11 as described above, operates as shown in FIG. 7.

Figure 7:
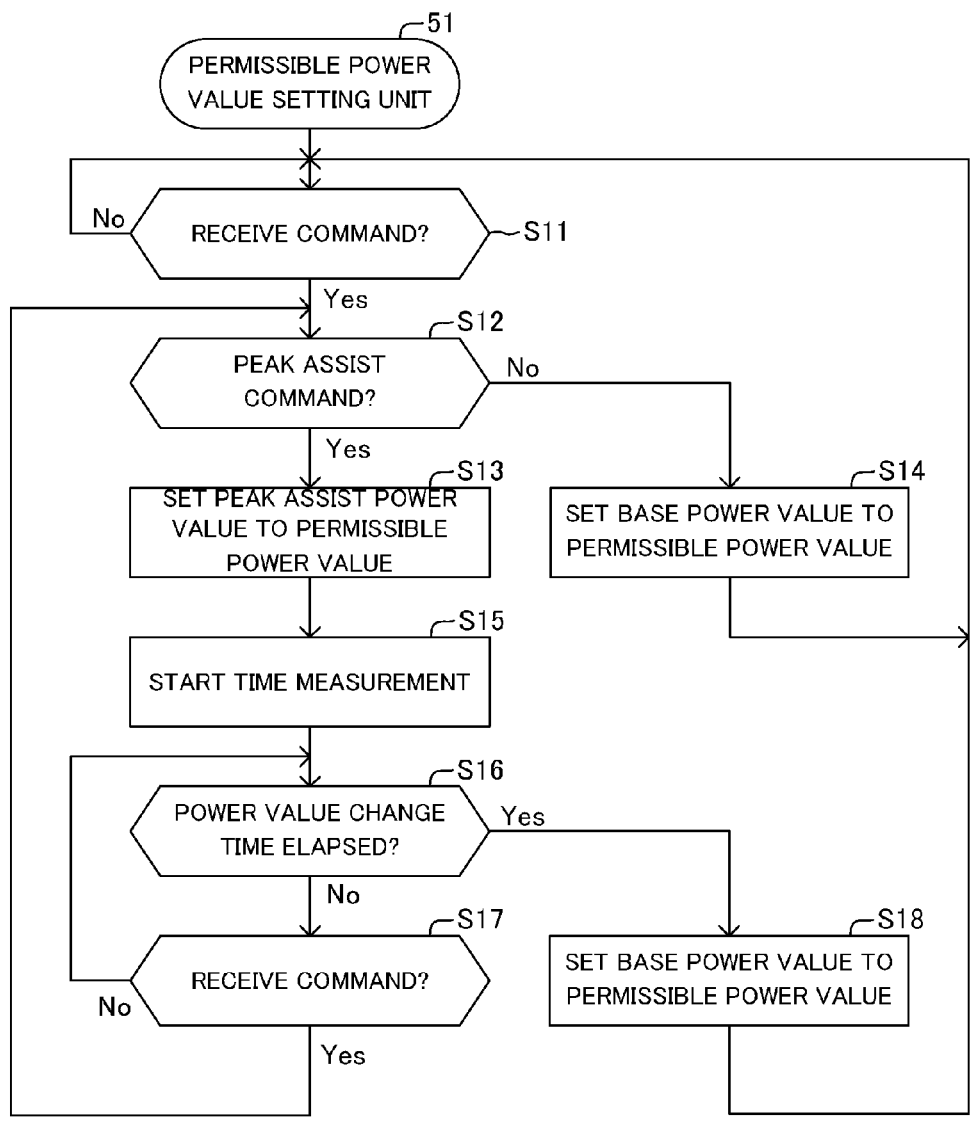
FIG. 7 is a flowchart showing operation of the permissible power setting unit disclosed in FIG. 2.

First, when the permissible power value setting unit 51 receives an input of the first command C1, of the power value setting commands, from the peak assist control unit 11 (step S11 of FIG. 7: Yes, step S12 of FIG. 7: Yes), the permissible power value setting unit 51 sets the permissible power value to a "peak assist power value" (step S13 of FIG. 7). For example, if the permissible power value setting unit 51 receives an input of the "first command" C1 when the permissible power value is the "base power value" Wb as shown by the leftmost reference sign C1 in FIG. 3, the permissible power value setting unit 51 sets the permissible power value to the "peak assist power value" Wa which is a larger value than the "base power value" Wb.

Then, the permissible power value setting unit 51 starts time measurement by a timer when it receives an input of the "first command" C1 as described above (step S15 of FIG. 7), and checks whether or not the predetermined power value change time Ta elapses (step S16 of FIG. 7). Here, it is assumed that the permissible power value setting unit 51 receives an input of a new "first command" from the peak assist control unit 11 before the power value change time Ta elapses from the start of the time measurement (step S16 of FIG. 7: No), that is, when a time Tb has elapsed from the start of the time measurement (step S17 of FIG. 7: Yes, step S12 of FIG. 17: Yes). Then, the permissible power value setting unit 51 resets the permissible power value to the "peak assist power value" (step S13 of FIG. 7), and starts new time measurement by a timer at the time when it receives an input of a new "first command" (step S15 of FIG. 7). For example, if the permissible power value setting unit 51 receives inputs of the "first command" C1 at time intervals Tb when the permissible power value is the "peak assist power value" Wa as shown by the reference signs C1 other than the leftmost reference sign C1 in FIG. 3, the permissible power value setting unit 51 resets the permissible power value to the "peak assist power value" Wa as it is.

Thereby, the server module 40 operates with power not more than the "peak assist power value" Wa which is the permissible power value having been set. In that case, if the server module 40 operates with power near the upper limit of the "peak assist power value", as power supply from the power supply unit 21 of the power supply module 20 is not enough, power is also supplied from the battery 22.

On the other hand, it is assumed that the permissible power value setting unit 51 receives an input of the "second command" from the peak assist control unit 11 before the power value change time Ta elapses from the start of the time measurement (step S16 of FIG. 7: No) (step S17 of FIG. 7: Yes, step S12 of FIG. 17: No). Then, the permissible power value setting unit 51 sets the permissible power value to the "base power value" (step S14 of FIG. 7). For example, if the permissible power value setting unit 51 receives an input of the "second command" C2 when the permissible power value is the "peak assist power value" Wa as shown by the reference sign C2 of FIG. 4, the permissible power value setting unit 51 sets the permissible power value to the "base power value" Wb.

Thereby, the server module 40 operates with power not more than the "base power value" Wb which is the permissible power value having been set. As such, power supply from the power supply unit 21 of the power supply module 20 is enough.

Here, description will be given again on the case where the permissible power value setting unit 51 receives an input of the first command" C1 from the peak assist control unit 11 and sets (resets) the permissible power value to the "peak assist power value" (step S13 of FIG. 7) and starts time measurement by a timer (step S15 of FIG. 7). At this time, as shown in FIG. 5, it is assumed that the permissible power value setting unit 51 does not receive an input of a new "first command" or "second command" from the peak assist control unit 11 even when the time Tb has elapsed from the start of the time measurement before the predetermined power value change time Ta elapses from the start of the time measurement by the timer (step S17 of FIG. 7: No, step S12 of FIG. 17: No). In that case, the time being measured will pass the power value change time Ta thereafter. As shown in FIG. 5, when the power value change time Ta elapses from the start of the time measurement (step S16 of FIG. 7: Yes), the permissible power value setting unit 51 automatically sets the permissible power value, having been set to the "peak assist power value" Wa, to the "base power value" Wb (step S18 of FIG. 7). As such, when the power value change time elapses from the time when the immediate input of the "first command" was received, the permissible power value setting unit 51 automatically sets the "peak assist power value", having been set (reset) by receiving the input of the "first command", to the "base power value" which is a value lower than it.

Then, the server module 40 controls the own device to operate with power not more than the "base power value" which is the permissible power value having been set. As such, the server module 40 is able to operate only with the power supplied from the power supply unit 21, whereby it is possible to reduce consumption of the battery 22.

As described above, according to the information processing system of the present invention, the permissible power value of the server module 40 is automatically set to be lower in the case where a power value setting command is invalid due to malfunction of the peak assist control unit 11 which gives setting commands of the permissible power value, for example. As such, the server module 40 is able to operate only with the power supplied from the power supply unit 21 without using the power of the battery 22, which prevents a down state caused by power shortage. It should be noted that when the power value change time has elapsed as described above, the power consumption control unit 52 of the server module 40 may perform shutdown after performing proper processing such as storing of data. Thereby, the server module 40 is able to prevent an unexpected down state.

Second Exemplary Embodiment

Figure 8:
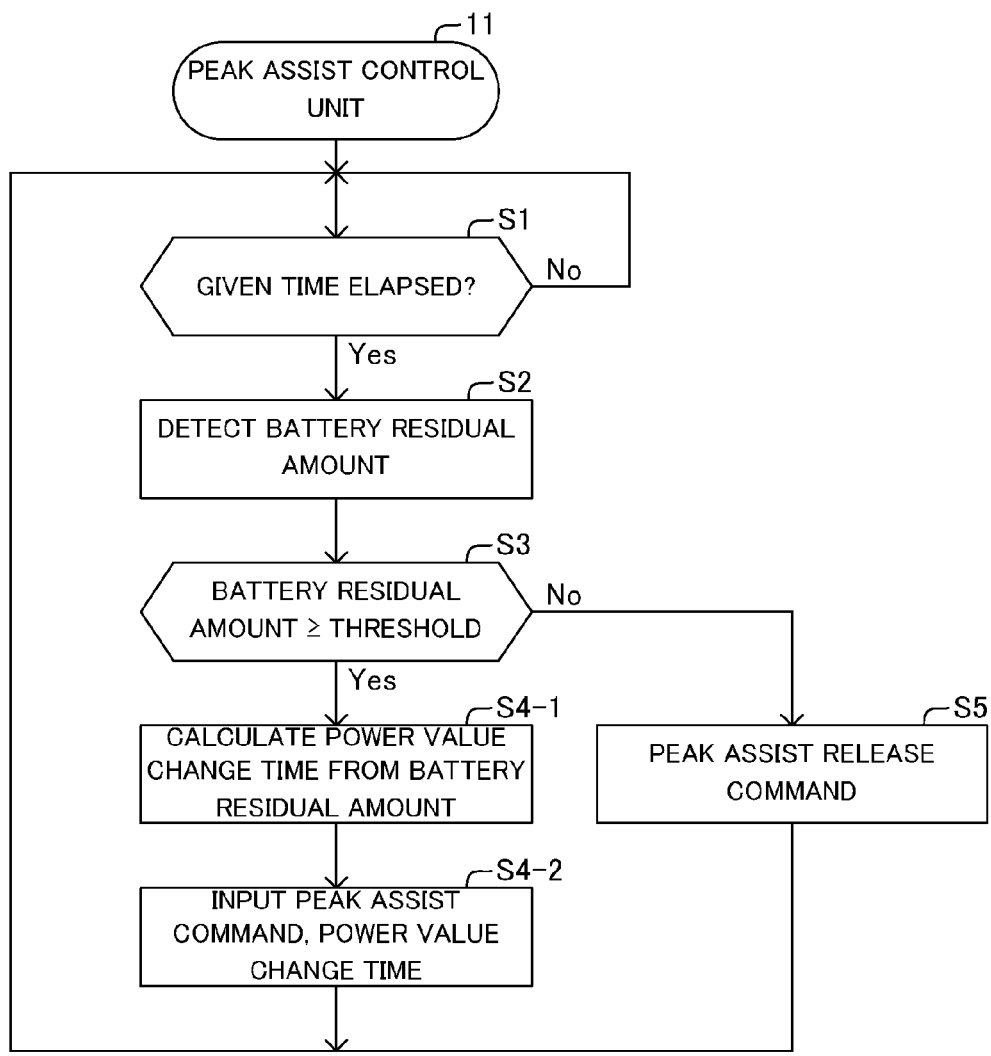
FIG. 8 is a flowchart showing operation of a peak assist control unit according to a second exemplary embodiment of the present invention.

Next, a second exemplary embodiment of the present invention will be described with reference to FIGS. 1, 8, and 9. The information processing system 1 of the present embodiment has an almost similar configuration as that of the first exemplary embodiment, as shown in FIG. 1. Hereinafter, different aspects from those of the first exemplary embodiment will be described in detail.

The peak assist control unit 11 constructed in the rack manager 10 of the present embodiment has a function of not only inputting the "first command", of the power value setting commands, to the server module 40, but also calculating the "power value change time" Ta and notifying the server module 40 of it. The peak assist control unit 11 calculates the power value change time Ta from the value of the power residual amount of the battery 22. For example, the peak assist control unit 11 calculates a maximum power value change time Ta in which the server module 40 is able to operate in a state where the "peak assist power value" is the permissible power value, with the power available from the power supply unit 21 and the power residual amount of the battery 22. However, the peak assist control unit 11 may calculate the power value change time Ta by means of another method.

Specifically, when the value of the power residual amount of the battery 22 is not less than the threshold as described above (step S3 of FIG. 8: Yes), the peak assist control unit 11 calculates the power value change time Ta based on the power residual amount of the battery 22 (step S4-1 of FIG. 8). Then, the peak assist control unit 11 inputs the calculated power value change time Ta, along with the "first command" due to the fact that the power residual amount of the battery 22 is not less that the threshold, to the server module 40 (step 4-2 of FIG. 8). It should be noted that the peak assist control unit 11 may input the power value change time Ta at different timing from the timing of inputting the "first command".

Figure 9:
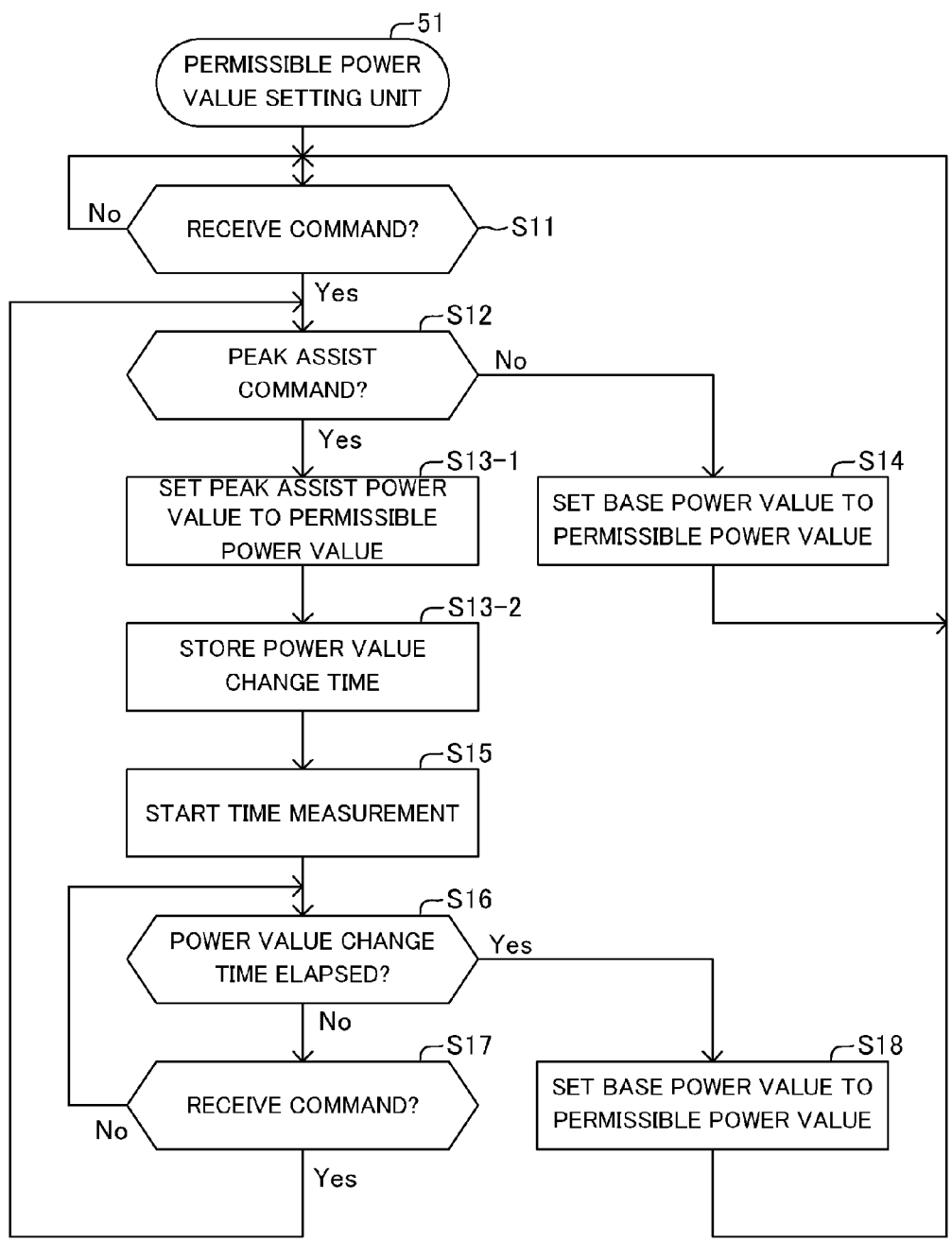
FIG. 9 is a flowchart showing operation of a permissible power setting unit according to the second exemplary embodiment of the present invention.

Further, the permissible power value setting unit 51 constructed in the server module 40 of the present embodiment receives the power value change time Ta, input along with the first command from the peak assist control unit 11 (step S11 of FIG. 9: Yes, step S12 of FIG. 9: Yes). Then, the permissible power value setting unit 51 sets the permissible power value to the "peak assist power value" according to the input of the first command (step S13-1 of FIG. 9), and also stores the input power value change time Ta in a storage unit such as a memory (step S13-2 of FIG. 9).

Then, the permissible power value setting unit 51 starts time measurement by a time when receiving the input of the first command (step S15 of FIG. 9), and checks whether or not the power value change time Ta, input from the peak assist control unit 11 and stored, elapses (step S16 of FIG. 9). Then, similar to the case of the first exemplary embodiment, if the power value change time Ta has elapsed without any input of the first command or the second command, the permissible power value setting unit 51 sets the permissible power value, having been set to the "peak assist power value", to the "base power value" (step S16 of FIG. 9: Yes, step S18 of FIG. 9). On the other hand, if an input of a new first command and the power value change time Ta is received before the power value change time Ta elapses, the permissible power value setting unit 51 resets the permissible power value to the "peak assist power value", and stores a new power value change time Ta, similar to the above-described case. Then, the permissible power value setting unit 51 checks whether or not the newly started measurement time by a timer passes the newly stored power value change time Ta.

As described above, according to the information processing system 1 of the present embodiment, as the time when the permissible power value becomes a state of the "peak assist power value" is set according to the power residual amount of the battery 22, it is possible to prevent the server module 40 from being down due to power shortage in a more reliable manner.

Third Exemplary Embodiment 3

Next, a third exemplary embodiment of the present invention will be described with reference to FIGS. 1, 10, and 11.

The information processing system 1 of the present embodiment has an almost similar configuration as that of the first exemplary embodiment, as shown in FIG. 1. Hereinafter, different aspects from those of the first exemplary embodiment will be described in detail.

The peak assist control unit 11 constructed in the rack manager 10 of the present embodiment has a function of not only inputting the "first command", of the power value setting commands, to the server module 40, but also calculating the "peak assist power value" (first power value) and notifying the server module 40 of it. The peak assist control unit 11 calculates the "peak assist power value" from the value of the power residual amount of the battery 22. For example, the peak assist control unit 11 calculates the "peak assist power value" in which the server module 40 is able to operate in a state where the "peak assist power value" is the permissible power value for the power value change time Ta, based on the power available from the power supply unit 21 and the power residual amount of the battery 22. However, the peak assist control unit 11 may calculate the "peak assist power value" by means of another method.

Figure 10:
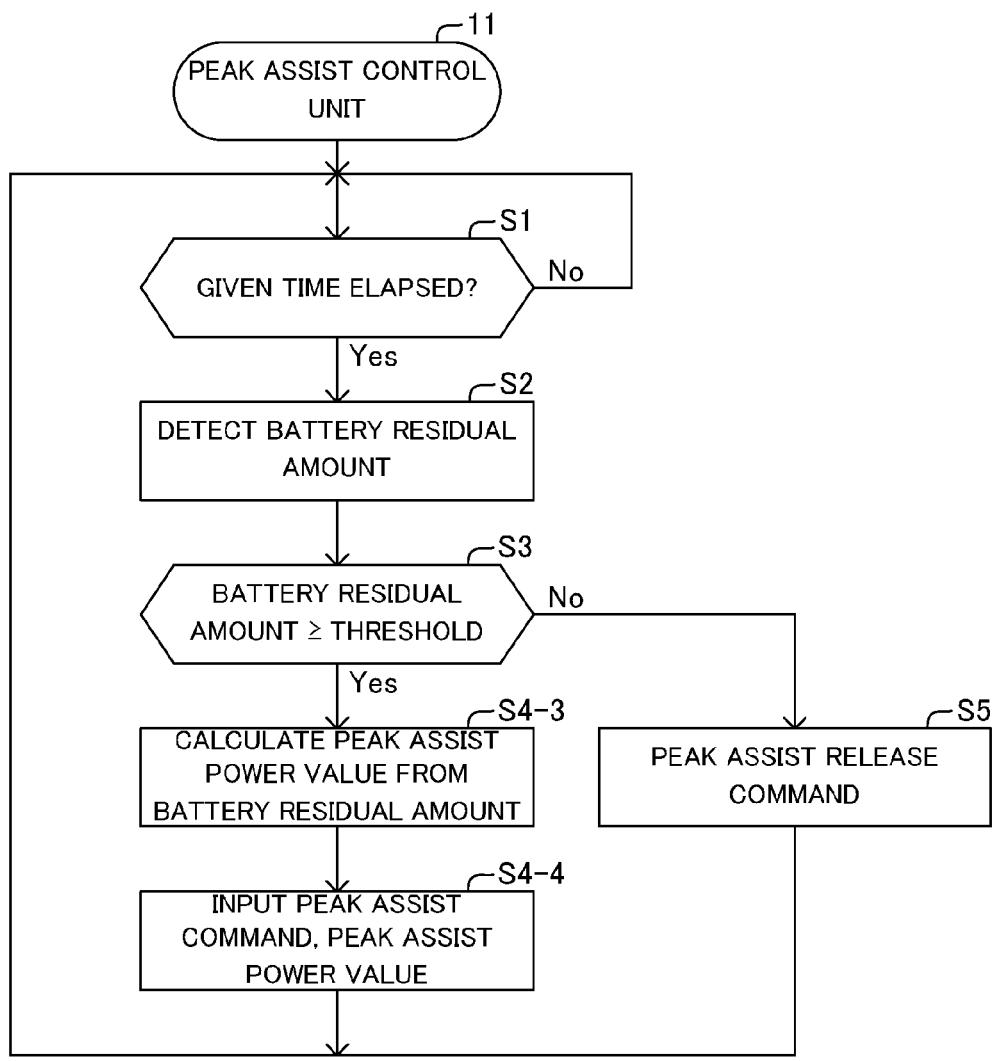
FIG. 10 is a flowchart showing operation of a peak assist control unit according to a third exemplary embodiment of the present invention.

Specifically, when the value of the power residual amount of the battery 22 is not less than a threshold (step S3 of FIG. 10: Yes), the peak assist control unit 11 calculates the "peak assist power value" based on the power residual amount of the battery 22 (step S4-3 of FIG. 10). Then, the peak assist control unit 11 inputs the calculated "peak assist power value", along with the "first command" due to the fact that the power residual amount of the battery 22 is not less that the threshold, to the server module 40 (step 4-4 of FIG. 10). It should be noted that the peak assist control unit 11 may input the "peak assist power value" at different timing from the timing of inputting the "first command".

Figure 11:
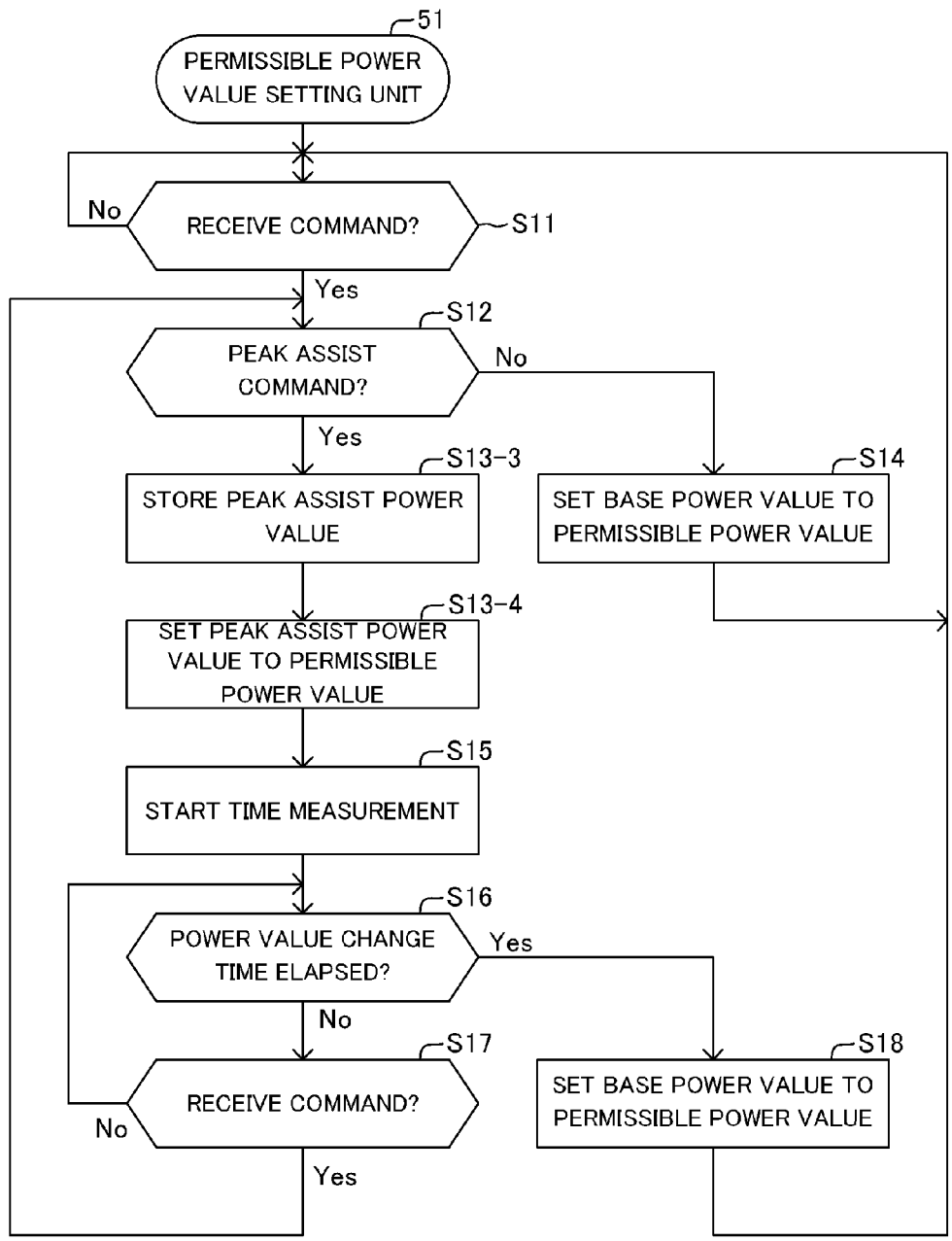
FIG. 11 is a flowchart showing operation of a permissible power setting unit according to the third exemplary embodiment of the present invention.

Further, the permissible power value setting unit 51 constructed in the server module 40 of the present embodiment receives the "peak assist power value", input along with the first command, from the peak assist control unit 11 (step S11 of FIG. 11: Yes, step S12 of FIG. 11: Yes). Then, the permissible power value setting unit 51 stores the input "peak assist power value" in a storage unit such as a memory (step S13-3 of FIG. 11). Further, the permissible power value setting unit 51 sets the permissible power value to the "peak assist power value" according to the input of the first command (step S13-4 of FIG. 11).

As described above, according to the information processing system 1 of the present embodiment, as the "peak assist power value", to which the permissible power value is set, is calculated according to the power residual amount of the battery 22, it is possible to prevent the server module 40 from being down due to power shortage in a more reliable manner.

It should be noted that the server module 40 of the present embodiment may has a function of setting the time when the permissible power value becomes a state of the "peak assist power value" according to the power residual amount of the battery 22, as described in the second exemplary embodiment. This means that the peak assist control unit 11 may be configured to calculate the "peak assist power value" and the "power value change time Ta" according to the residual amount of the battery, and the server module 40 is configured to operate according to those values.

Fourth Exemplary Embodiment

Next, a fourth exemplary embodiment of the present invention will be described with reference to FIG. 12. An information processing device 100 according to the present embodiment corresponds to individual server module 40 in the information processing system 1 of each of the above-described exemplary embodiments. However, the information processing device 100 is not limited to a server computer in the form of a rack server, and may be an information processing device of any configuration such as a desktop or notebook computer or a mobile information processing terminal.

The information processing device 100 of the present embodiment includes a CPU (Central Processing Unit) which is an arithmetic unit, and a storage unit such as a memory, although not shown. The information processing device 100 also includes a receiving unit 101 (receiving unit), a power consumption control unit 102 (power consumption control unit), and a power receiving unit 103 (power receiving unit), which are constructed by incorporating a program in the CPU.

Further, as a power supply module, the information processing device 100 includes a power supply unit (PSU) 201 (another power supply unit) which converts power from the AC source into a direct current and supplies it to the information processing device 100, and a power storage unit 202 which stores power and supplies the power to the information processing device 100. The power supply module supplies power required by the information processing device 100, under the cooperation between the power supply unit 201 and the power storage unit 202 (see reference sign Pin FIG. 12).

Accordingly, when the information processing device 100 requires power more than the power available from the power supply unit 201, power is supplied not only from the power supply unit 201 but also from the power storage unit 202. In that case, the residual amount of the power stored in the power storage unit 202 is decreased. Meanwhile, when the information processing device 100 requires power not more than the power available from the power supply unit 201, as the power supplied only from the power supply unit 21 is enough, the extra power available from the power supply unit 201 is stored in the power storage unit 202.

In the information processing device 100 of the above configuration, when the receiving unit 101 receives an input of a predetermined notice, a permissible power value which is a maximum value of available power consumption is set to a first power value. For example, the first power value is a higher value than a second power value which is a power value available only from the power supply unit 201. Then, the information processing device 100 controls, by the power consumption control unit 102, the own device to operate with power not more than the first power value having been set. As such, in such a state, power is supplied not only from the power supply unit 201 but also from the power storage unit 202, from the power supply module.

Then, when a power value change time has elapsed, which is a predetermined period of time from the time when the notice of setting the permissible power value to the first power value is input, the power consumption control unit 102 of the information processing device 100 automatically sets the permissible power value to a second power value which is a lower value than the first power value. As such, even in the case where a notice from a device (function unit) which gives a setting command of the permissible power value becomes invalid, it is possible to prevent a state where the permissible power value is set to be high so that power supply even from the power storage unit 202 is continued. Consequently, it is possible to prevent the information processing device 100 from being a down state due to power shortage.

Figure 12:
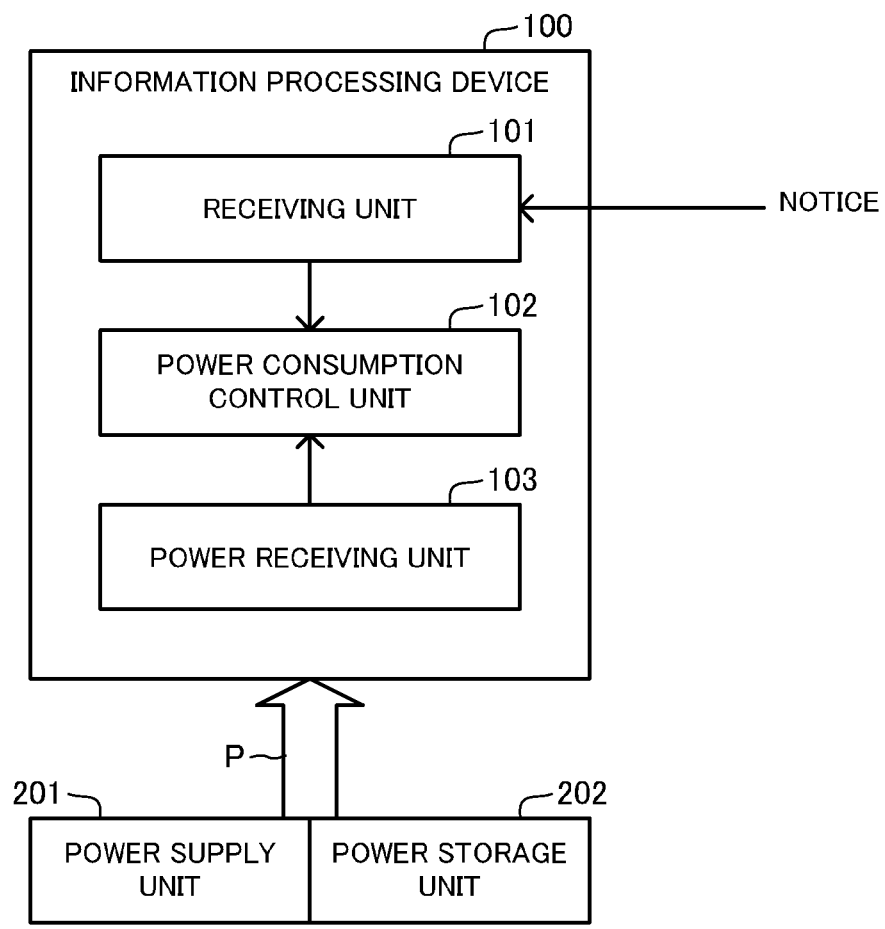
FIG. 12 is a block diagram showing a configuration of an information processing device according to a fourth exemplary embodiment of the present invention.

It should be noted that while, in FIG. 12, description has been given based on the assumption that a notice is input from the outside of the information processing device 100, the notice may be input from a predetermined processor installed inside the information processing device 100. Thereby, even in the case where a problem is caused such as occurrence of a failure in a given processor installed in the information processing device 100, it is possible to prevent the information processing device 100 from being a down state due to power shortage.

Fifth Exemplary Embodiment

Next, a fifth exemplary embodiment of the present invention will be described with reference to FIG. 13. The information processing device 100 constituting the information processing system of the present embodiment corresponds to individual server modules 40 in the information processing system 1 of each of the above-described exemplary embodiments. However, the information processing device 100 is not limited to a server computer in the form of a rack server, and may be an information processing device of any configuration such as a desktop or notebook computer or a mobile information processing terminal, similar to the case of the fourth exemplary embodiment.

The information processing device 100 of the present embodiment includes a CPU (Central Processing Unit) which is an arithmetic unit, and a storage unit such as a memory, although not shown. The information processing device 100 also includes a receiving unit 101 (receiving unit), a power consumption control unit 102 (power consumption control unit), and a power receiving unit 103 (power receiving unit), which are constructed by incorporating a program in the CPU.

Further, a power supply module 200 includes a power supply unit 201 (PSU) (another power supply unit) which converts power from the AC source into a direct current and supplies it to the information processing device 100, and a power storage unit 202 which stores power and supplies the power to the information processing device 100. The power supply module 200 supplies power required by the information processing device 100, under the cooperation between the power supply unit 201 and the power storage unit 202 (see reference sign P in FIG. 13).

Accordingly, when the information processing device 100 requires power more than the power available from the power supply unit 201, power is supplied not only from the power supply unit 201 but also from the power storage unit 202. In that case, the residual amount of the power stored in the power storage unit 202 is decreased. Meanwhile, when the information processing device 100 requires power not more than the power available from the power supply unit 201, as the power only supplied from the power supply unit 21 is enough, the extra power available from the power supply unit 201 is stored in the power storage unit 202.

The present embodiment also include a function unit 300 such as a peak assist function for inputting a power control notice to the information processing device 100 according to the residual amount of the power stored in the power storage unit 202.

According to the configuration described above, the function unit 300 detects the residual amount of the power in the power storage unit 202, and inputs a power control notice, according to the power residual amount, to the information processing device 100. Then, when the receiving unit 101 receives an input of a predetermined power control notice, the information processing device 100 sets the permissible power value, which is a maximum value of available power consumption, to a first power value. For example, the first power value is a higher value than a second power value which is a power value available only from the power supply unit. Then, the information processing device 100 controls, by the power consumption control unit 102, the own device to operate with power not more than the first power value having been set. As such, in such a state, power is supplied not only from the power supply unit 201 but also from the power storage unit 202, from the power supply module 200.

Then, when a power value change time has elapsed, which is a predetermined period of time from the time when a power value setting command to set the permissible power value to the first power value is input, the power consumption control unit 102 of the information processing device 100 automatically sets the permissible power value to the second power value which is a lower value than the first power value, as described above. As such, even in the case where a notice from the function unit 300 which gives a setting command of the permissible power value becomes invalid, it is possible to prevent a state where the permissible power value is set to be high so that power supply even from the power storage unit 202 is continued. Consequently, it is possible to prevent the information processing device 100 from being a down state due to power shortage.

Figure 13:
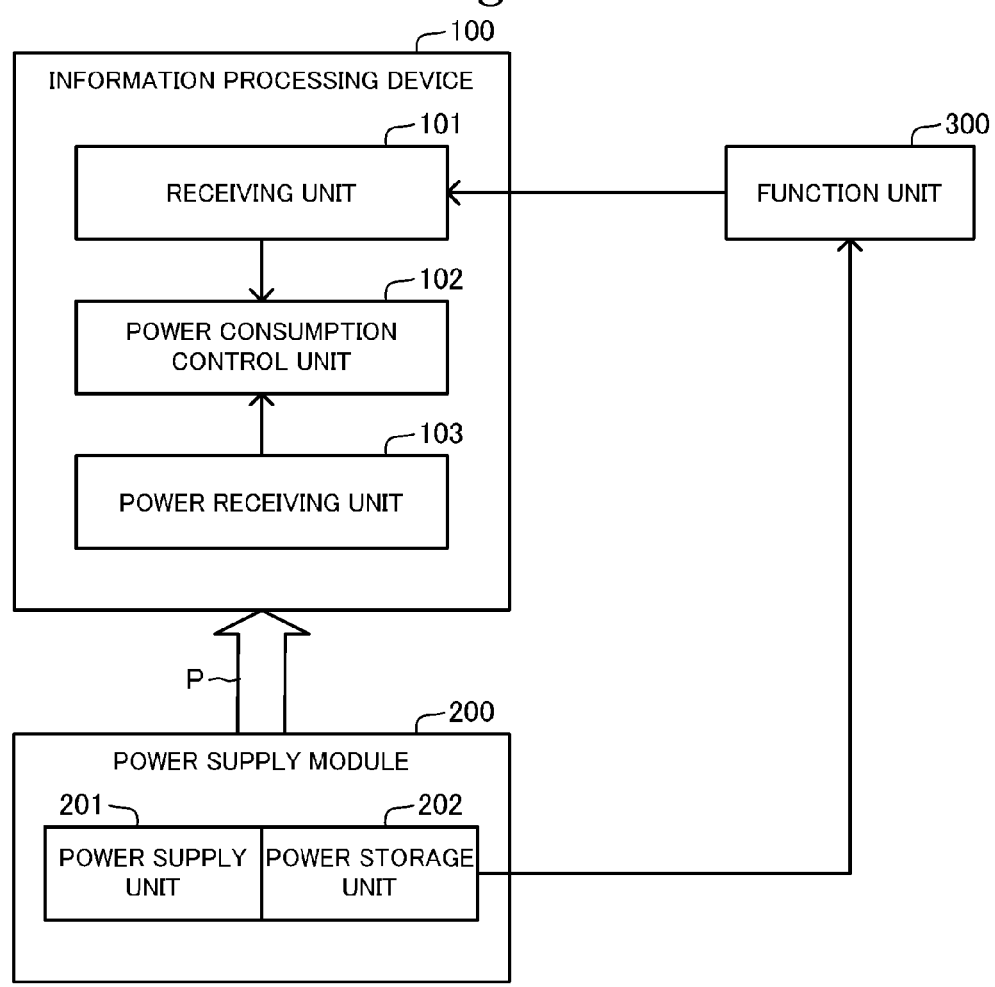
FIG. 13 is a block diagram showing a configuration of an information processing system according to a fifth exemplary embodiment of the present invention.

It should be noted that while, in FIG. 13, description has been given based on the assumption that the function unit 300 is installed outside the information processing device 100, the function unit 300 may be installed inside the information processing device 100. For example, the function unit 300 may be configured of a processor provided on a substrate such as a baseboard management controller installed in the information processing device 100. Thereby, even in the case where a problem is caused such as occurrence of a failure in a processor constituting the function unit 300, it is possible to prevent the information processing device 100 from being a down state due to power shortage, as described above.

Sixth Exemplary Embodiment

Next, a sixth exemplary embodiment of the present invention will be described. An information processing device constituting an information processing system of the present embodiment has a configuration similar to that of the information processing systems shown in the first to third exemplary embodiments and the information processing device 100 shown in the fourth and fifth exemplary embodiments. However, in the present embodiment, the function of the power consumption control unit 102 (permissible power setting unit 51) differs from that of the above-described exemplary embodiments as described below. Hereinafter, a configuration of the power consumption control unit 102 (permissible power setting unit 51) of the present embodiment will be described with reference to the configuration of the information processing device 100 of FIG. 13.

When the power consumption control unit 102 of the present embodiment receives an input of a predetermined power control notice from the function unit 300 or another configuration, a permissible power value which is a maximum value of available power consumption is set to a first power value according to the content of the power control notice, similar to the above description. For example, the first power value is a higher value than a second power value which is a power value available only from the power supply unit. Then, the power consumption control unit 102 controls the own device to operate with power not more than the first power value having been set. As such, in such a state, power is supplied not only from the power supply unit 201 but also from the power storage unit 202, from the power supply module 200.

Then, the power consumption control unit 102 checks whether or not a predetermined condition is satisfied, after a first notice of setting the permissible power value to the first power value is input. Here, the case of "satisfying a predetermined condition" includes the case where "the power value change time elapses" as described above, but not limited thereto. For example, "satisfying a predetermined condition" includes the case where information such as the first notice which should be transmitted periodically from the function unit 300 is not received by the information processing device 100, and the case where information (ACK) which should be transmitted by the function unit 300, in response to an inquiry from the information processing device 100, is not received by the information processing device 100 within a predetermined time. The case of "satisfying a predetermined condition" also includes the case where operation of the function unit 300 is not confirmed by any method, such as the case of detecting that the function unit 300 has not been able to detect the battery residual amount.

Further, the case of "satisfying a predetermined condition" also includes the case where the information processing device 100 detects a change in the state of supplying power from the power supply module 200, regardless of the operating state of the function unit 300, as described above. It also includes the case where the information processing device 100 detects a change in the power supply state from the power supply module 200, that is, the case where the information processing device 100 detects that the voltage from the power supply module 200 becomes a predetermined value or less, for example.

As such, the power consumption control unit 102 has a function of obtaining information for determined whether or not the condition is satisfied, and based on the obtained information, checks whether or not the predetermined condition is satisfied, after a notice to set the permissible power value to the first power value is input.

Then, when the power consumption control unit 102 determines that the predetermined condition is satisfied after a notice to set the permissible power value to the first power value is input, the power consumption control unit 102 automatically sets the permissible power value to the second power value which is a lower value than the first power value. For example, if the permissible power value setting unit 101 detects that the function unit 300 is not operating or detects q voltage fluctuation after a notice of setting the permissible power value to the first power value is input, the permissible power value setting unit 101 sets the permissible power value to the second power value which is a lower value than the first power value.

As such, even in the case where a permissible power value is not able to be set properly due to occurrence of any failure in the function unit 300 or on other grounds, it is possible to prevent a state where the permissible power value is set to be high so that power supply is continued even from the power storage unit 202. Consequently, it is possible to prevent the information processing device 100 from being a down state due to power shortage.

<Supplementary Notes>

The whole or part of the above-described exemplary embodiments can be described as, but not limited to, the following supplementary notes. Hereinafter, the outlines of the configurations of an information processing device, an information processing system, a program, and a power value setting method, according to the present invention, will be described. However, the present invention is not limited to the configurations described below.

(Supplementary Note 1)

An information processing device comprising:

a receiving unit that receives a notice;

a power receiving unit that receives power supplied from a power storage unit and another power supply unit; and a power consumption control unit that controls power consumption such that the power consumption does not exceed a power value set by the notice, wherein if a predetermined condition is satisfied, the power consumption control unit controls the power consumption such that the power consumption does not exceed a power value available from the other power supply unit.

(Supplementary Note 2)

The information processing device according to supplementary note 1, wherein the power consumption control unit controls the power consumption such that the power consumption does not exceed the power value available from the other power supply unit, if the predetermined condition, that an operation of a function unit that transmits the notice is not confirmed, is satisfied.

(Supplementary Note 3)

The information processing device according to supplementary note 2, wherein the power consumption control unit controls the power consumption such that the power consumption does not exceed the power value available from the other power supply unit, if the predetermined condition, that information which should be transmitted from the function unit is not acknowledged, is satisfied.

(Supplementary Note 4)

The information processing device according to supplementary note 2 or 3, wherein the power consumption control unit controls the power consumption such that the power consumption does not exceed the power value available from the other power supply unit, if the predetermined condition, that information which is transmitted periodically from the function unit is not acknowledged, is satisfied.

(Supplementary Note 5)

The information processing device according to any of supplementary notes 2 to 4, wherein the power consumption control unit controls the power consumption such that the power consumption does not exceed the power value available from the other power supply unit, if the predetermined condition, that a predetermined period of time has elapsed after reception of the notice from the function unit, is satisfied.

(Supplementary Note 6)

The information processing device according to supplementary note 5, wherein the power consumption control unit controls the power consumption such that the power consumption does not exceed a first power value when a first notice, of the notices, is received, the first power value being a power value higher than the power value available from the other power supply unit, and controls the power consumption such that the power consumption does not exceed a second power value which is the power value available from the other power supply unit, when a power value change time, which is a predetermined period of time, has elapsed after reception of the first notice.

(Supplementary Note 7)

The information processing device according to supplementary note 6, wherein if the power consumption control unit receives a new first notice after the reception of the first notice and before the power value change time elapses, the power consumption control unit controls the power consumption such that the power consumption does not exceed the second power value, when the power value change time has elapsed after reception of the new first notice.

(Supplementary Note 8)

The information processing device according to supplementary note 7, wherein the power value change time is a period of time longer than a time interval of transmitting the first notice.

(Supplementary Note 9)

The information processing device according to any of supplementary notes 6 to 8, wherein the power consumption control unit controls the power consumption such that the power consumption does not exceed the first power value, when the power consumption control unit receives the first notice from the function unit which is configured to transmit the first notice according to a residual amount of power stored in the power storage unit.

(Supplementary Note 10)

The information processing device according to supplementary note 9, wherein the power consumption control unit receives, from the function unit, and stores the power value change time set by the function unit according to the residual amount of the power stored in the power storage unit, and controls the power consumption such that the power consumption does not exceed the second power value, when the power value change time has elapsed after the reception of the first notice.

(Supplementary Note 11)

The information processing device according to any of supplementary notes 1 to 10, wherein the power consumption control unit controls the power consumption such that the power consumption does not exceed the power value available from the other power supply unit, if the predetermined condition, that a state of supplying the power is changed, is satisfied.

The information processing device according to the above-described invention operates with power supplied from the power supply module equipped with the power storage unit and the other power supply unit. Then, when the information processing device receives a notice from a function unit configured to transmit a predetermined notice, for example, the information processing device controls the power consumption of the own device such that the power consumption does not exceed the power value set by the notice. At this time, if the information processing device receives a first notice of the notices, for example, the information processing device controls the power consumption such that the power consumption does not exceed a first power value which is a power value higher than the power value available from the other power supply unit. As such, from the power supply module, power is supplied not only from the other power supply unit but also from the power storage unit. It should be noted that if the information processing device receives a second notice of the notices, the information processing device controls power consumption such that the power consumption does not exceed a second power value which is a power value available from the other power supply unit.

Then, in a state where the power consumption is controlled not to exceed the first power value, if a predetermined condition is satisfied, the information processing device automatically controls the power consumption such that the power consumption does not exceed the power value available from the other power supply unit (second power value). For example, the predetermined condition includes the case where information which should be transmitted from the function unit or information which is transmitted periodically from the function unit is not received, and the case where the operation of the function unit is not confirmed, that is, a predetermined time has elapsed after reception of the latest first notice, for example. In the case where the operation of the function unit is not confirmed as described above, the power consumption may be kept in a state where it is set to a value not more than the first power value which is larger than the second power value. As such, with the configuration of the present invention as described above, it is possible to prevent a state where power is supplied from both the other power supply unit and the power storage unit, whereby operation can be made with power only supplied from the other power supply unit. Consequently, it is possible to prevent the information processing device from being down due to power shortage.

Further, as described above, as timing of the first notice and the power value change time are set according to the residual amount of the power in the power storage unit, it is possible to prevent the information processing device from being down due to power shortage in a more reliable manner.

(Supplementary Note 12)

An information processing system comprising:

a power supply module including a power storage unit and another power supply unit;

an information processing device that receives power supplied from the power supply module; and a function unit that notifies the information processing device of a power control notice, wherein the information processing device includes:

a receiving unit that receives the power control notice; and a power consumption control unit that controls power consumption such that the power consumption does not exceed a power value set by the power control notice, and if a predetermined condition is satisfied, the power consumption control unit controls the power consumption such that the power consumption does not exceed a power value available from the other power supply unit.

(Supplementary Note 12.1)

The information processing system according to supplementary note 12, wherein the power consumption control unit controls the power consumption such that the power consumption does not exceed a power value available from the other power supply unit, if the predetermined condition, that an operation of the function unit is not confirmed, is satisfied.

(Supplementary Note 12.2)

The information processing system according to supplementary note 12.1, wherein the function unit transmits information which should be transmitted to the information processing device by an operation of the function unit, and the power consumption control unit controls the power consumption such that the power consumption does not exceed the power value available from the other power supply unit, if the predetermined condition, that the information which should be transmitted from the function unit is not acknowledged, is satisfied.

(Supplementary Note 12.3)

The information processing system according to supplementary note 12.1 or 12.2, wherein the function unit periodically transmits information to the information processing device by an operation of the function unit, and the power consumption control unit controls the power consumption such that the power consumption does not exceed the power value available from the other power supply unit, if the predetermined condition, that the information which is transmitted periodically from the function unit is not acknowledged, is satisfied.

(Supplementary Note 12.4)

The information processing system according to supplementary note 12.3, wherein the function unit notifies the information processing device of a first notice, of the power control notices, according to a residual amount of power stored in the power storage unit, and the power consumption control unit controls the power consumption such that the power consumption does not exceed a first power value when the first notice is received, the first power value being a power value higher than the power value available from the other power supply unit, and controls the power consumption such that the power consumption does not exceed a second power value which is the power value available from the other power supply unit, when a power value change time, which is a predetermined period of time, has elapsed after reception of the first notice.

(Supplementary Note 12.5)

The information processing system according to supplementary note 12.4, wherein the function unit notifies the information processing device of the first notice at a predetermined time interval according to the residual amount of the power stored in the power storage unit, and if the power consumption control unit receives a new first notice after the reception of the first notice and before the power value change time elapses, the power consumption control unit controls the power consumption such that the power consumption does not exceed the second power value, when the power value change time has elapsed after reception of the new first notice.

(Supplementary Note 12.6)

The information processing system according to any of supplementary notes 12 to 12.5, comprising a plurality of the information processing devices, wherein the power supply module is configured to supply power to one or a plurality of the information processing devices, and the function unit is configured to notify one or a plurality of the information processing devices of the power value control notice.

(Supplementary Note 12.7)

The information processing system according to supplementary note 12.6, wherein the plurality of the information processing devices, the power supply module, and the function unit are installed on respective shelves formed in a server rack.

(Supplementary Note 12.8)

The information processing system according to supplementary note 12.7, wherein a plurality of the information processing devices are installed on one given shelf formed in the server rack.

(Supplementary Note 13)

A management device comprising a function unit that notifies an information processing device of a power control notice, the information processing device being configured to receive power supplied from a power storage unit and another power supply unit, wherein the power control notice is a notice for controlling power consumption of the information processing device such that the power consumption does not exceed a power value set by the power control notice, upon receipt by the information processing device, and the function unit is configured to transmit information indicating that the function unit is operating, to the information processing device which controls the power consumption such that the power consumption does not exceed a power value available from the other power supply unit, if the operation of the function unit is not confirmed.

(Supplementary Note 13.1)

The management device according to supplementary note 13, wherein the function unit transmits information which should be transmitted to the information processing device by an operation of the function unit.

(Supplementary Note 13.2)

The management device according to supplementary note 13 or 13.1, wherein the function unit periodically transmits information to the information processing device by an operation of the function unit.

(Supplementary Note 14)

A program for causing an information processing device to realize:

a receiving unit that receives a notice; and a power consumption control unit that receives power supplied from a power storage unit and another power supply unit, and controls power consumption such that the power consumption does not exceed a power value set by the notice, wherein if a predetermined condition is satisfied, the power consumption control unit controls the power consumption such that the power consumption does not exceed a power value available from the other power supply unit.

(Supplementary Note 14.1)

The program according to supplementary note 14, wherein the power consumption control unit controls the power consumption such that the power consumption does not exceed the power value available from the other power supply unit, if the predetermined condition, that an operation of a function unit that transmits the notice is not confirmed, is satisfied.

(Supplementary Note 15)

A program for causing a management device to realize:

a function unit that notifies an information processing device of a power control notice, the information processing device receiving power supplied from a power storage unit and another power supply unit, wherein the power control notice is a notice for controlling power consumption of the information processing device such that the power consumption does not exceed a power value set by the power control notice, upon receipt by the information processing device, and the function unit is configured to transmit information indicating that the function unit is operating, to the information processing device which controls the power consumption such that the power consumption does not exceed a power value available from the other power supply unit, if the operation of the function unit is not confirmed.

(Supplementary Note 16)

A power consumption control method comprising:

receiving a notice;

receiving power supplied from a power storage unit and another power supply unit;

controlling power consumption such that the power consumption does not exceed a power value set by the notice, and if a predetermined condition is satisfied, controlling the power consumption such that the power consumption does not exceed a power value available from the other power supply unit.

(Supplementary Note 16.1)

The power consumption control method according to supplementary note 16, further comprising:

controlling the power consumption such that the power consumption does not exceed a power value available from the other power supply unit, if the predetermined condition, that an operation of a function unit that transmits the notice is not confirmed, is satisfied.

(Supplementary Note 17)

A power control method comprising:

notifying an information processing device of a power control notice, the information processing device receiving power supplied from a power storage unit and another power supply unit, the power control notice being a notice for controlling power consumption of the information processing device such that the power consumption does not exceed a power value set by the power control notice, upon receipt by the information processing device; and transmitting information indicating that a management device is operating, to the information processing device which controls the power consumption such that the power consumption does not exceed a power value available from the other power supply unit, if the operation of the management device is not confirmed.

(Supplementary Note 18)

An information processing device comprising:

a receiving means for receiving a notice;

a power receiving means for receiving power supplied from a power storage unit and another power supply unit; and a power consumption control means for controlling power consumption such that the power consumption does not exceed a power value set by the notice, wherein if a predetermined condition is satisfied, the power consumption control means controls the power consumption such that the power consumption does not exceed a power value available from the other power supply unit.

(Supplementary Note 19)

An information processing system comprising:

a power supply module including a power storage unit and another power supply unit;

an information processing device that receives power supplied from the power supply module; and a function unit that notifies the information processing device of a power control notice, wherein the information processing device includes:

a receiving means for receiving the power control notice; and a power consumption control means for controlling power consumption such that the power consumption does not exceed a power value set by the power control notice, and if a predetermined condition is satisfied, the power consumption control means controls the power consumption such that the power consumption does not exceed a power value available from the other power supply unit.

(Supplementary Note 20)

A program for causing an information processing device to realize:

a receiving means for receiving a notice; and a power consumption control means for receiving power supplied from a power storage unit and another power supply unit, and controls power consumption such that the power consumption does not exceed a power value set by the notice, wherein if a predetermined condition is satisfied, the power consumption control means controls the power consumption such that the power consumption does not exceed a power value available from the other power supply unit.

It should be noted that the program described above is stored in a storage device or on a computer-readable storing medium. For example, a storing medium may be a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

The invention claimed is:

1. An information processing device comprising:
a receiving unit that receives a notice;
a power receiving unit that receives power supplied from a power storage unit and another power supply unit; and
a power consumption control unit that controls power consumption such that the power consumption does not exceed a power value set by the notice,
wherein if a predetermined condition is satisfied, the power consumption control unit controls the power consumption such that the power consumption does not exceed a power value available from the other power supply unit, and
wherein the power consumption control unit controls the power consumption such that the power consumption does not exceed the power value available from the other power supply unit, if the predetermined condition, that an operation of a function unit that transmits the notice is not confirmed, is satisfied.

2. The information processing device according to claim 1, wherein
the power consumption control unit controls the power consumption such that the power consumption does not exceed the power value available from the other power supply unit, if the predetermined condition, that information which should be transmitted from the function unit is not acknowledged, is satisfied.

3. The information processing device according to claim 1, wherein
the power consumption control unit controls the power consumption such that the power consumption does not exceed the power value available from the other power supply unit, if the predetermined condition, that information which is transmitted periodically from the function unit is not acknowledged, is satisfied.

4. The information processing device according to claim 1, wherein
the power consumption control unit controls the power consumption such that the power consumption does not exceed the power value available from the other power supply unit, if the predetermined condition, that a predetermined period of time has elapsed after reception of the notice from the function unit, is satisfied.

5. The information processing device according to claim 4, wherein
the power consumption control unit controls the power consumption such that the power consumption does not exceed a first power value when a first notice, of the notices, is received, the first power value being a power value higher than the power value available from the other power supply unit, and controls the power consumption such that the power consumption does not exceed a second power value which is the power value available from the other power supply unit, when a power value change time, which is a predetermined period of time, has elapsed after reception of the first notice.

6. The information processing device according to claim 5, wherein
if the power consumption control unit receives a new first notice after the reception of the first notice and before the power value change time elapses, the power consumption control unit controls the power consumption such that the power consumption does not exceed the second power value, when the power value change time has elapsed after reception of the new first notice.

7. The information processing device according to claim 6, wherein
the power value change time is a period of time longer than a time interval of transmitting the first notice.

8. The information processing device according to claim 5, wherein
the power consumption control unit controls the power consumption such that the power consumption does not exceed the first power value, when the power consumption control unit receives the first notice from the function unit which is configured to transmit the first notice according to a residual amount of power stored in the power storage unit.

9. The information processing device according to claim 8, wherein
the power consumption control unit receives, from the function unit, and stores the power value change time set by the function unit according to the residual amount of the power stored in the power storage unit, and controls the power consumption such that the power consumption does not exceed the second power value, when the power value change time has elapsed after the reception of the first notice.

10. The information processing device according to claim 1, wherein
the power consumption control unit controls the power consumption such that the power consumption does not exceed the power value available from the other power supply unit, if the predetermined condition, that a state of supplying the power is changed, is satisfied.

11. An information processing system comprising:
a power supply module including a power storage unit and another power supply unit;
an information processing device that receives power supplied from the power supply module; and
a function unit at notifies the information processing device of a power control notice, wherein the information processing device includes:
a receiving unit that receives the power control notice; and
a power consumption control unit that controls power consumption such that the power consumption does not exceed a power value set by the power control notice, and
if a predetermined condition is satisfied, the power consumption control unit controls the power consumption such that the power consumption does not exceed a power value available from the other power supply unit, and
wherein the power consumption control unit controls the power consumption such that the power consumption does not exceed the power value available from the other power supply unit, if the predetermined condition, that an operation of a function unit that transmits the notice is not confirmed, is satisfied.

12. A management device comprising
a function unit that notifies an information processing device of a power control notice, the information processing device being configured to receive power supplied from a power storage unit and another power supply unit, wherein
the power control notice is a notice for controlling power consumption of the information processing device such that the power consumption does not exceed a power value set by the power control notice, upon receipt by the information processing device, and
the function unit is configured to transmit information indicating that the function unit is operating, to the information processing device which controls the power consumption such that the power consumption does not exceed a power value available from the other power supply unit, if the operation of the function unit is not confirmed, and
wherein the information processing device controls the power consumption such that the power consumption does not exceed the power value available from the other power supply unit, if the predetermined condition, that an operation of a function unit that transmits the notice is not confirmed, is satisfied.

13. A non-transitory computer-readable medium storing a program comprising instructions for causing an information processing device to realize:
a receiving unit that receives a notice; and
a power consumption control unit that receives power supplied from a power storage unit and another power supply unit, and controls power consumption such that the power consumption does not exceed a power value set by the notice, wherein
if a predetermined condition is satisfied, the power consumption control unit controls the power consumption such that the power consumption does not exceed a power value available from the other power supply unit, and
wherein the power consumption control unit controls the power consumption such that the power consumption does not exceed the power value available from the other power supply unit, if the predetermined condition, that an operation of a function unit that transmits the notice is not confirmed, is satisfied.

14. A non-transitory computer-readable medium storing a program comprising instructions for causing a management device to realize:
a function unit that notifies an information processing device of a power control notice, the information processing device receiving power supplied from a power storage unit and another power supply unit, wherein
the power control notice is a notice for controlling power consumption of the information processing device such that the power consumption does not exceed a power value set by the power control notice, upon receipt by the information processing device, and
the function unit is configured to transmit information indicating that the function unit is operating, to the information processing device which controls the power consumption such that the power consumption does not exceed a power value available from the other power supply unit, if the operation of the function unit is not confirmed, and
wherein the information processing device controls the power consumption such that the power consumption does not exceed the power value available from the other power supply unit, if the predetermined condition, that an operation of a function unit that transmits the notice is not confirmed, is satisfied.

15. A power consumption control method for an information processing device, the method comprising:
receiving a notice by a receiving unit;
receiving power supplied from a power storage unit and another power supply unit;
controlling power consumption, by a power consumption control unit, such that the power consumption does not exceed a power value set by the notice, and
if a predetermined condition is satisfied, controlling the power consumption, by the power consumption control unit, such that the power consumption does not exceed a power value available from the other power supply unit,
wherein the power consumption control unit controls the power consumption such that the power consumption does not exceed the power value available from the other power supply unit, if the predetermined condition, that an operation of a function unit that transmits the notice is not confirmed, is satisfied.

16. A power control method comprising:
notifying an information processing device of a power control notice, the information processing device receiving power supplied from a power storage unit and another power supply unit, the power control notice being a notice for controlling power consumption of the information processing device such that the power consumption does not exceed a power value set by the power control notice, upon receipt by the information processing device; and
transmitting information indicating that a management device is operating, to the information processing device which controls the power consumption such that the power consumption does not exceed a power value available from the other power supply unit, if the operation of the management device is not confirmed,
wherein the information processing device controls the power consumption such that the power consumption does not exceed the power value available from the other power supply unit, if the predetermined condition, that an operation of a function unit that transmits the notice is not confirmed, is satisfied.

17. An information processing device comprising:
a receiving unit that receives a notice;
a power receiving unit that receives power supplied from a power storage unit and another power supply unit; and a power consumption control unit that controls power consumption such that the power consumption does not exceed a power value set by the notice, wherein if a predetermined condition is satisfied, the power consumption control unit controls the power consumption such that the power consumption does not exceed a power value available from the other power supply unit; wherein the power consumption control unit controls the power consumption such that the power consumption does not exceed the power value available from the other power supply unit, if the predetermined condition, that an operation of a function unit that transmit the notice is not confirmed, is satisfied, wherein when the information processing device requires power not exceeding the power value available from the other power supply unit, power is supplied only from the other power supply unit, while when the information processing device requires power exceeding the power value available from the other power supply unit, power is supplied not only from the other power supply unit but also from the power storage unit.

18. The information processing device according to claim 1, wherein the power consumption control unit includes a power peak-assist function, such that the power consumption does not exceed the power value available from the other power supply unit, in which electrical power is always supplied from the other power supply unit, and when the power value available from the other power supply unit is short of a threshold, power is additionally supplied from the power storage unit storing power to assist power supply from the other power supply unit.

19. The information processing device according to claim 1, wherein the power storage unit comprises a battery storing power, and the other power supply unit converts power from an alternating current source into a direct current.

20. The power control method according to claim 16 is configured to be stored in a memory and executed on a processor.

* * * * *